(12) United States Patent
Adams

(10) Patent No.: US 8,438,558 B1
(45) Date of Patent: May 7, 2013

(54) SYSTEM AND METHOD OF UPDATING PROGRAMS AND DATA

(75) Inventor: Stephen Robert Adams, Seattle, WA (US)

(73) Assignee: Google Inc., Mountain View, CA (US)

( * ) Notice: Subject to any disclaimer, the term of this patent is extended or adjusted under 35 U.S.C. 154(b) by 908 days.

(21) Appl. No.: 12/383,616

(22) Filed: Mar. 27, 2009

(51) Int. Cl.
*G06F 9/445* (2006.01)

(52) U.S. Cl.
USPC ........... 717/170; 717/168; 717/174; 717/177; 717/178

(58) Field of Classification Search .................. None
See application file for complete search history.

(56) References Cited

U.S. PATENT DOCUMENTS

| | | |
|---|---|---|
| 3,969,723 A | 7/1976 | Kennicott |
| 4,115,853 A | 9/1978 | Dummermuth |
| 4,278,837 A | 7/1981 | Best |
| 4,319,079 A | 3/1982 | Best |
| 4,425,618 A | 1/1984 | Bishop et al. |
| 4,464,650 A | 8/1984 | Eastman et al. |
| 4,465,901 A | 8/1984 | Best |
| 4,542,453 A | 9/1985 | Patrick et al. |
| 4,683,549 A | 7/1987 | Takaki |
| 4,807,182 A | 2/1989 | Queen |
| 4,831,517 A | 5/1989 | Crouse et al. |
| 4,972,504 A | 11/1990 | Daniel, Jr. et al. |
| 4,987,550 A | 1/1991 | Leonard et al. |
| 5,043,871 A | 8/1991 | Nishigaki et al. |
| 5,051,745 A | 9/1991 | Katz |
| 5,146,221 A | 9/1992 | Whiting et al. |
| 5,155,847 A | 10/1992 | Kirouac et al. |
| 5,170,465 A | 12/1992 | McKeeman et al. |
| 5,193,180 A | 3/1993 | Hastings |
| 5,204,960 A | 4/1993 | Smith et al. |
| 5,210,854 A | 5/1993 | Beaverton et al. |
| 5,247,660 A | 9/1993 | Ashcraft et al. |
| 5,260,693 A | 11/1993 | Horsley |
| 5,307,492 A | 4/1994 | Benson |
| 5,319,645 A | 6/1994 | Bassi et al. |
| 5,335,344 A | 8/1994 | Hastings |
| 5,347,653 A | 9/1994 | Flynn et al. |

(Continued)

FOREIGN PATENT DOCUMENTS

| | | |
|---|---|---|
| CA | 2111958 A1 | 1/1993 |
| DE | 69232761 T2 | 4/2003 |

(Continued)

OTHER PUBLICATIONS

Ajmani, Sameer, "A Review of Software Upgrade TeChniques for Distributed Systems", MIT Computer Science and Artificial IntelliQence Laboratory, Aug. 7, 2002, pp. 1-19, Cambridge, MA.

(Continued)

*Primary Examiner* — Isaac Tecklu
(74) *Attorney, Agent, or Firm* — Lerner, David, Littenberg, Krumholz & Mentlik, LLP

(57) ABSTRACT

A system and method are provided to (a) convert an older or base version of software into an alternate representation of the base version; (b) convert a newer or updated version of software into an alternate representation of the updated version; (c) compare the alternate updated version with the alternate base version (d) modify portions of the alternate updated version based on the comparison and (e) create a patch, where the patch represents the differences between the alternate updated version and the alternate base version.

37 Claims, 17 Drawing Sheets

U.S. PATENT DOCUMENTS

| | | | |
|---|---|---|---|
| 5,357,629 A | 10/1994 | Dinnis et al. | |
| 5,359,730 A | 10/1994 | Marron | |
| 5,392,390 A | 2/1995 | Crozier | |
| 5,410,703 A | 4/1995 | Nilsson et al. | |
| 5,450,589 A | 9/1995 | Maebayashi et al. | |
| 5,465,258 A | 11/1995 | Adams | |
| 5,473,772 A | 12/1995 | Halliwell et al. | |
| 5,479,654 A | 12/1995 | Squibb | |
| 5,481,713 A | 1/1996 | Wetmore et al. | |
| 5,491,821 A | 2/1996 | Kilis | |
| 5,493,674 A | 2/1996 | Mizutani et al. | |
| 5,502,439 A | 3/1996 | Berlin | |
| 5,535,329 A | 7/1996 | Hastings | |
| 5,546,586 A | 8/1996 | Wetmore et al. | |
| 5,574,573 A | 11/1996 | Ray et al. | |
| 5,574,898 A | 11/1996 | Leblang et al. | |
| 5,574,906 A | 11/1996 | Morris | |
| 5,581,697 A | 12/1996 | Gramlich et al. | |
| 5,581,768 A | 12/1996 | Garney et al. | |
| 5,588,143 A | 12/1996 | Stupek, Jr. et al. | |
| 5,600,834 A | 2/1997 | Howard | |
| 5,619,698 A | 4/1997 | Lillich et al. | |
| 5,630,072 A | 5/1997 | Dobbins | |
| 5,634,052 A | 5/1997 | Morris | |
| 5,636,366 A | 6/1997 | Robinson et al. | |
| 5,659,755 A | 8/1997 | Strohacker | |
| 5,675,802 A | 10/1997 | Allen et al. | |
| 5,675,803 A | 10/1997 | Preisler et al. | |
| 5,694,566 A | 12/1997 | Nagae | |
| 5,699,275 A | 12/1997 | Beasley et al. | |
| 5,732,275 A | 3/1998 | Kullick et al. | |
| 5,745,058 A | 4/1998 | Auerbach et al. | |
| 5,745,906 A | 4/1998 | Squibb | |
| 5,752,039 A | 5/1998 | Tanimura | |
| 5,757,690 A | 5/1998 | McMahon | |
| 5,761,649 A | 6/1998 | Hill | |
| 5,764,987 A | 6/1998 | Eidt et al. | |
| 5,764,994 A | 6/1998 | Craft | |
| 5,790,760 A | 8/1998 | Arima et al. | |
| 5,790,796 A | 8/1998 | Sadowsky | |
| 5,790,856 A | 8/1998 | Lillich | |
| 5,790,860 A | 8/1998 | Wetmore et al. | |
| 5,794,254 A | 8/1998 | McClain | |
| 5,799,144 A | 8/1998 | Mio | |
| 5,802,549 A | 9/1998 | Goyal et al. | |
| 5,805,899 A | 9/1998 | Evans et al. | |
| 5,813,017 A | 9/1998 | Morris | |
| 5,815,704 A | 9/1998 | Shimotsuji et al. | |
| 5,815,714 A | 9/1998 | Shridhar et al. | |
| 5,829,001 A | 10/1998 | Li et al. | |
| 5,832,520 A | 11/1998 | Miller | |
| 5,835,701 A | 11/1998 | Hastings | |
| 5,837,986 A | 11/1998 | Barile et al. | |
| 5,838,264 A | 11/1998 | Cooper | |
| 5,844,508 A | 12/1998 | Murashita et al. | |
| 5,848,274 A | 12/1998 | Hamby et al. | |
| 5,873,097 A | 2/1999 | Harris et al. | |
| 5,884,094 A | 3/1999 | Begun et al. | |
| 5,886,991 A | 3/1999 | Guarneri et al. | |
| 5,889,995 A | 3/1999 | Segnan | |
| 5,893,113 A | 4/1999 | McGrath et al. | |
| 5,897,633 A | 4/1999 | Nolan | |
| 5,901,225 A | 5/1999 | Ireton et al. | |
| 5,909,581 A | 6/1999 | Park | |
| 5,938,766 A | 8/1999 | Anderson et al. | |
| 5,953,534 A | 9/1999 | Romer et al. | |
| 5,956,479 A | 9/1999 | McInerney et al. | |
| 5,958,048 A | 9/1999 | Babaian et al. | |
| 5,960,189 A | 9/1999 | Stupek, Jr. et al. | |
| 5,964,873 A | 10/1999 | Choi | |
| 5,966,541 A | 10/1999 | Agarwal | |
| 5,974,254 A | 10/1999 | Hsu | |
| 5,978,791 A | 11/1999 | Farber et al. | |
| 5,982,937 A | 11/1999 | Accad | |
| 5,983,000 A | 11/1999 | Perron | |
| 5,990,810 A | 11/1999 | Williams | |
| 5,995,754 A | 11/1999 | Holzle et al. | |
| 6,006,328 A | 12/1999 | Drake | |
| 6,009,261 A | 12/1999 | Scalzi et al. | |
| 6,018,349 A | 1/2000 | Szeliski et al. | |
| 6,018,747 A | 1/2000 | Burns et al. | |
| 6,021,272 A | 2/2000 | Cahill et al. | |
| 6,026,235 A | 2/2000 | Shaughnessy | |
| 6,052,531 A | 4/2000 | Waldin, Jr. et al. | |
| 6,071,004 A | 6/2000 | Le Gall et al. | |
| 6,071,317 A | 6/2000 | Nagel | |
| 6,076,134 A | 6/2000 | Nagae | |
| 6,077,311 A | 6/2000 | Lichtenstein et al. | |
| 6,078,931 A | 6/2000 | Motoyama | |
| 6,112,025 A | 8/2000 | Mulchandani et al. | |
| 6,115,550 A | 9/2000 | Hunter et al. | |
| 6,122,731 A | 9/2000 | Son | |
| 6,141,698 A | 10/2000 | Krishnan et al. | |
| 6,163,780 A | 12/2000 | Ross | |
| 6,163,811 A | 12/2000 | Porter | |
| 6,167,407 A | 12/2000 | Nachenberg et al. | |
| 6,175,663 B1 | 1/2001 | Huang | |
| 6,189,145 B1 | 2/2001 | Bellin, Jr. et al. | |
| 6,192,157 B1 | 2/2001 | Prebble | |
| 6,192,475 B1 | 2/2001 | Wallace | |
| 6,202,208 B1 | 3/2001 | Holiday, Jr. | |
| 6,216,140 B1 * | 4/2001 | Kramer | 715/234 |
| 6,216,175 B1 * | 4/2001 | Sliger et al. | 717/169 |
| 6,216,213 B1 | 4/2001 | Breternitz, Jr. et al. | |
| 6,230,316 B1 | 5/2001 | Nachenberg | |
| 6,240,550 B1 | 5/2001 | Nathan et al. | |
| 6,243,766 B1 | 6/2001 | Sliger et al. | |
| 6,253,317 B1 | 6/2001 | Knapp, III et al. | |
| 6,260,157 B1 | 7/2001 | Schurecht et al. | |
| 6,263,497 B1 | 7/2001 | Maeda et al. | |
| 6,282,698 B1 | 8/2001 | Baker et al. | |
| 6,282,709 B1 | 8/2001 | Reha et al. | |
| 6,289,358 B1 | 9/2001 | Mattis et al. | |
| 6,289,509 B1 | 9/2001 | Kryloff | |
| 6,292,880 B1 | 9/2001 | Mattis et al. | |
| 6,295,644 B1 | 9/2001 | Hsu et al. | |
| 6,298,481 B1 | 10/2001 | Kosaka et al. | |
| 6,305,010 B2 | 10/2001 | Agarwal | |
| 6,317,754 B1 | 11/2001 | Peng | |
| 6,330,574 B1 | 12/2001 | Murashita | |
| 6,330,712 B1 | 12/2001 | Iwaya | |
| 6,334,213 B1 | 12/2001 | Li | |
| 6,349,407 B1 | 2/2002 | Towfiq | |
| 6,367,075 B1 | 4/2002 | Kruger et al. | |
| 6,374,250 B2 | 4/2002 | Ajtai et al. | |
| 6,389,592 B1 | 5/2002 | Ayres et al. | |
| 6,397,385 B1 | 5/2002 | Kravitz | |
| 6,404,923 B1 | 6/2002 | Chaddha | |
| 6,421,679 B1 | 7/2002 | Chang et al. | |
| 6,425,125 B1 | 7/2002 | Fries et al. | |
| 6,430,685 B1 | 8/2002 | Yu et al. | |
| 6,434,695 B1 | 8/2002 | Esfahani et al. | |
| 6,438,621 B1 | 8/2002 | Kanamori et al. | |
| 6,438,748 B1 | 8/2002 | Gard et al. | |
| 6,463,582 B1 | 10/2002 | Lethin et al. | |
| 6,466,999 B1 | 10/2002 | Sliger et al. | |
| 6,496,974 B1 | 12/2002 | Sliger et al. | |
| 6,510,552 B1 | 1/2003 | Benayoun et al. | |
| 6,526,574 B1 * | 2/2003 | Jones | 717/168 |
| 6,532,588 B1 | 3/2003 | Porter | |
| 6,546,552 B1 | 4/2003 | Peleg | |
| 6,594,822 B1 * | 7/2003 | Schweitz et al. | 717/140 |
| 6,610,103 B2 | 8/2003 | Ehrman et al. | |
| 6,618,747 B1 | 9/2003 | Flynn et al. | |
| 6,629,123 B1 | 9/2003 | Hunt | |
| 6,643,506 B1 | 11/2003 | Criss et al. | |
| 6,643,775 B1 | 11/2003 | Granger et al. | |
| 6,651,249 B2 * | 11/2003 | Waldin et al. | 717/170 |
| 6,691,305 B1 | 2/2004 | Henkel et al. | |
| 6,738,799 B2 | 5/2004 | Dickenson | |
| 6,754,848 B1 | 6/2004 | Froehlich et al. | |
| 6,757,893 B1 | 6/2004 | Haikin | |
| 6,760,907 B2 | 7/2004 | Shaylor | |
| 6,804,663 B1 * | 10/2004 | Delo | 1/1 |
| 6,952,823 B2 | 10/2005 | Kryloff et al. | |
| 7,131,112 B1 * | 10/2006 | Bartz et al. | 717/122 |
| 7,203,708 B2 | 4/2007 | Liu et al. | |

| | | | |
|---|---|---|---|
| 7,542,758 | B2 | 6/2009 | Rajaram et al. |
| 7,587,433 | B2 | 9/2009 | Peleg et al. |
| 7,665,081 | B1* | 2/2010 | Pavlyushchik ............... 717/168 |
| 2002/0087500 | A1 | 7/2002 | Berkowitz et al. |
| 2002/0100036 | A1 | 7/2002 | Moshir et al. |
| 2003/0028867 | A1* | 2/2003 | Kryloff et al. ............... 717/171 |
| 2003/0163508 | A1 | 8/2003 | Goodman |
| 2003/0163805 | A1 | 8/2003 | Hata et al. |
| 2003/0217257 | A1 | 11/2003 | Ebsen et al. |
| 2004/0063899 | A1 | 4/2004 | Kobayashi et al. |
| 2004/0078793 | A1 | 4/2004 | Bragulla et al. |
| 2004/0088694 | A1* | 5/2004 | Ho ............................... 717/170 |
| 2004/0107416 | A1* | 6/2004 | Buban et al. ................. 717/170 |
| 2005/0132349 | A1* | 6/2005 | Roberts et al. ............... 717/168 |
| 2005/0132359 | A1 | 6/2005 | McGuire et al. |
| 2005/0257206 | A1 | 11/2005 | Semerdzhiev |
| 2006/0004756 | A1 | 1/2006 | Peleg et al. |
| 2007/0169082 | A1* | 7/2007 | Lam et al. .................... 717/168 |
| 2007/0255764 | A1 | 11/2007 | Sonnier et al. |

FOREIGN PATENT DOCUMENTS

| | | |
|---|---|---|
| EP | 0411232 A2 | 2/1991 |
| EP | 0472812 A1 | 3/1992 |
| EP | 0546684 A2 | 6/1993 |
| EP | 0591360 A1 | 4/1994 |
| EP | 0665496 A1 | 8/1995 |
| EP | 0695040 A2 | 1/1996 |
| EP | 0702299 A1 | 3/1996 |
| EP | 0723226 A1 | 7/1996 |
| EP | 0752794 A2 | 1/1997 |
| EP | 0813167 A2 | 12/1997 |
| EP | 1014263 A2 | 6/2000 |
| EP | 1087533 A1 | 3/2001 |
| GB | 2330428 A | 4/1999 |
| JP | 59201150 A | 11/1984 |
| JP | 63208941 A | 8/1988 |
| JP | 04092924 A | 3/1992 |
| JP | 4242829 A | 8/1992 |
| JP | 5091550 A | 4/1993 |
| JP | 05120067 A | 5/1993 |
| JP | 06314194 A | 11/1994 |
| JP | 08101770 A | 4/1996 |
| JP | 09069042 A | 3/1997 |
| JP | 10003383 A | 1/1998 |
| JP | 11126161 A | 5/1999 |
| WO | 9300633 A1 | 1/1993 |
| WO | 9632679 A1 | 10/1996 |
| WO | 9712508 A2 | 4/1997 |
| WO | 9743711 A1 | 11/1997 |
| WO | 9904336 A1 | 1/1999 |
| WO | 9954816 A1 | 10/1999 |
| WO | 0034861 A1 | 6/2000 |
| WO | 2004063899 A2 | 7/2004 |
| WO | 2005024628 A2 | 3/2005 |

OTHER PUBLICATIONS

Baker, Brenda, "A Program for Identifying Duplicated Code", Computing Science and Statistics, 24th Symposium, Mar. 18-21, 1992, vol. 24, 9 paQes, College Station, TX.

Baker et al., "Compressing Differences of Executable Code", ACM Slc;3PLAN Workshop on Compiler Support for System Software (WCSSS), Apr. 22, 1999, pp. 1-10, Atlanta, GA.

Bartoletti et al., "Secure Software Distribution System", Proceedings of the 20th National Information Systems Security Conference, Jun. 18, 1997, 11 pages, Baltimore, MD.

Bashar et ai, "Low-Threat Security Patches and Tools", Proceedings of the International Conference on Software Maintenance, Nov. 30, 1996,23 paQes, IEEE Computer Society, WashinQton, DC.

Chambers et al., "A User Designed Software System for Electron Microprobes—Basic Premises and the Control Program", Journal de Physique, Feb. 1984, pp. 223-226, vol. 45, No. 2, Les Editions de Physique, Les Ulis, France.

Cheung et al., "Optimal Routing Table Design for IP Address Lookups Under Memory Constraints", IEEE Proceedings of INFOCOM, Mar. 1999,8 pages, New York, NY.

Church et al., "Dotplot: a Program for Exploring Self-Similarity in Millions of Lines of Text and Code", Jun. 1993), Journal of Computational and Graphical Statistics, vol. 2, No. 2, 12 pages, American Statistical Association, Alexandria, VA.

Cifuentes et al., "Decompilation of Binary Programs", Software Practice and Experience, Jul. 1995, vol. 25 (7), pp. 811-829, John Wiley & Sons, Ltd., United KinQdom.

Cifuentes, Cristina, "Reverse Compilation Techniques", Queensland University of Technology, Jul. 1994, pp. 1-342.

Clodfelter et al., "Technological Profile of Shopping Centers: Present and Future Use", Journal of Shopping Center Research, Spring/Summer 1996, pp. 59-93, International Council of Shopping Centers Educational Foundation, New York, NY.

Cook et al., "A Methodology for Cost-Effective Analysis of In-Place Software Processes", IEEE Transaction on Software Engineering, Jan. 1997, pp. 1-25.

Duntemann, Jeff, Assembly Language: Step-by-Step, pp. 1-469,1992, John Wiley & Sons, Inc., New York, NY.

Eastwood, David B., "Information TeChnology and Fresh PrOduce: A Case Study Using Store Level Scan Data to Analyze Sales", Jul. 1997, 20 pages, University of Minnesota, St. Paul, MN.

Engler, Dawson R., "VCODE: A Retargetable, ExtenSible, Very Fast Dynamic Code Generation System", May, 1996, SIGPLAM Conference on Programming Language Design and Implementation, 11 pages, ACM Press, Philadelphia, PA.

Flake, Halvar, "Structural Comparison of Executable Objects", Proceedings of the IEEE Conference on Detection of Intrusions and Malware & Vulnerability Assessment, 2004, pp. 161-173, Dartmund, Germany.

Fraser et al., "A Machine-Independent Linker", Software Practice and Experience, Department of Computer Science, The University of Arizona, 1982, vol. 12, pp. 351-366, United Kingdom.

Gosling et ai, "The Java Language Environment", May 1996, pp. 1-98, Sun Microsystems, Mountain View, CA.

Gray, Robert M., "Fundamentals of Data Compression", IEEE Proceedings of International Conference on Information, Communications, and Signal ProcessinQ, Sep. 9, 1997, pp. 1-186, SinQapore International Search Report mailed Mar. 25, 2010, International Application No. PCT/IL2009/000762.

International Search Report mailed Feb. 15, 2010, International Application No. PCT/IL2009/000754.

International Search Report mailed Feb. 15, 2010, International Application No. PCT/IL2009/000755.

International Business Machines Corporation, "Method for permitting several versions of a module to coexist within a virtual machine", Mar. 1,2001,8 pages, vol. 443, No. 177, Mason Publications, Hampshire, Great Britain.

Mogul et al., "Potential benefit of delta encoding and data compression for HTTP", Proceedings of SIGCOMM '97, Sep. 1997, pp. 14 pages, ACM, New York, NY.

Munch, Bjorn, "Versioning in a Software Engineering Database—the Change Oriented Way", Division of Computer Systems and Telematics, The Norwegian Institute of Technology, Sep. 17, 1993, pp. 1-284, Germany.

Mycroft et al., "Optimising compilation, Part I: classical imperative languages", Proceedings of SOFSEM, 1992, pp. 1-17, Czechoslovakia.

Nilsen, Kelvin, "Issues in the Design and Implementation of Real-Time Java", Jul. 19, 1996, pp. 1-28, SYSCON Media, Montvale, NJ.

Oplinger et al., "Software and Hardware for Exploiting Speculative Parallelism with a Multiprocessor", Stanford University Computer Systems Laboratory, Feb. 1997, pp. 1-23, Stanford, CA.

Oreizy, Peyman, "Decentralized Software Evolution", Proceedings of the International Conference on the Principles of Software Evolution, Apr. 20-21, 1998, pp. 1-5, ACM, New York, NY.

"PKZIP 6.0 for Windows Getting Started Manual", Copyright 2002 PKWARE, Inc., 13 pages, Milwaukee, WI.

Pellegrini et al., "Efficient IP Table Lookup via Adaptive Stratified Trees with Selective Reconstruction", Lecture Notes in Computer Science Sep. 2004, pp. 1-26, Springer Berlin, Germany.

Roth et al., "Database Compression", Sigmod Record, Sep. 1993, vol. 22, No. 3, pp. 31-39, ACM, New York, NY.

Saha et al., "Symbolic Support Graph: A Space Efficient Data Structure for Incremental Tabled Evaluation", Department of Computer SCience, Lectures Notes in Computer Science, Oct. 10, 2005, vol. 3668, pp. 1-15, Springer, Germany.
Stevens, Curt, "Knowledge-Based Assistant for Accessing Large, Poorly Structured Information Spaces", Thesis Submitted to the Faculty of the Graduate School of the University of Colorado, 1993, 125 pages, Boulder, CO.
Tichy, Walter F., "RCS—A System for Version Control", Department of Computer Sciences, Purdue UniverSity, 1985, vol. 15, pp. 1-19, Wiley, United Kinqdom.
Tichy, Walter F., "The String-to-String Correction Problem with Block Moves", Purdue University, Oct. 26, 1983, 16 pages, ACM, New York, NY.
Tsou et al., "Client-Server Components and Metadata Objects for Distributed Geographic Information Services", Proceedings of the GIS/LIS, 1998, pp. 590-599, Association of American Geography, Washington, DC.
Wolfe et al., "Executing Compressed Programs on an Embedded RISC Architecture", 1992, pp. 81-91, IEEE Computer Society Press Los Alamitos, CA.
Zeller, Andreas, "Configuration Management with Version Sets", A Unified Software Versioning Model and its Applications, Apr. 1, 1997, pp. 1-320, Technische Universitat Braunschweig, Germany.
Gryder et al., "Survey of Data Compression Techniques", Martin Marietta Energy Systems, Inc. for the United States of Energy, Sep. 1991, 45 pages, Oak Ridge, TN.
Hardy et al., "Essence: A Resource Discovery System Based on Semantic File Indexing", Proceedings of the USENIX Winter Conference, Jan. 25-29, 1993, pp. 361-374.
Hirschberg, Daniel S., "Algorithms for the Longest Common Subsequence Problem", Journal of.the ACM, Oct. 1977, vol. 24, No. 4, pp. 664-675, ACM, New York, NY.
Hoshi et al., "Software Updated System Using Wireless Communication", NTT DoCoMo Technical Journal, 2004, vol. 5, No. 4, pp. 36-43, Japan.
Hung et al., "UNIX Code Management and Distribution", Sep. 1992, pp. 1 A, Stanford Linear Accelerator Center, Stanford, CA.
Keller et al., "Binary Component Adaptation", Computing Sciences Technology Report No. ECOOP '98 Proceedings, Lecture Notes on Computer Science, Proceedings of the 12th European Conference on Object-Oriented Programming, 1998, vol. 1445, pp. 1-17.
Kifer, Michael, "Ediff User's Manual", Version 2.70, Mar. 1998, pp. 1-44.
Kishan et al., "Dynamic Kernel Modification and Extensibility", Technical Report of the SU IF Group, Department of Computer SCience, 2002, 26 pages, Stanford University, Stanford, CA.
Larus et al., "Rewriting Executable Files to Measure Program BehaviOr", Software, University of Wisconsin—Madison, Mar. 25, 1992, vol. 24, pp. 1-17, Wiley Interscience, United Kingdom.
Lefurgy, Charles Robert, "Efficient Execution of Compressed Programs", Dissertation, 2000, pp. 1-212, University of Michigan, Ann Arbor, MI.
Request for EX Parte Reexamination filed Jan. 22, 2010 for Patent No. 6,546,552.
Decision Granting EX Parte Reexamination for Patent No. 5,546,552 mailed Mar. 16, 2010.
Percival, Wadham College University of Oxford, Thesis submitted for the degree of Doctor of Philosophy, Hilary 2006.
Hunt et al., "Delta Algorithms: An Empirical Analysis", ACM Transactions on Softward Engineering and Methodology, 7 (2); 192-214 (1998).
Wang et al., Microsoft Research Technical Report: MSR-TR-99-83, Accepted to 2nd Annual Workshop on Feedback-Directed Optimization (FDO), Haifa, Israel, Nov. 15, 1999, 11 pages.
http://www.ddj.com/article/printableArticle.
jhtml?articleID=184409550&dept_url=/architect, Dr. Dobb's, A Cross-Platform Binary Diff (1995).
Burns, "Differential Compression: A Generalized Solution for Binary Files", Dec. 1996, 69 pages.
Horwitz, "Identifying the Semantic and Textual Differences Between Two Versions of a Program", University of Wisconsin-Madison, 13 pages,1990.
Gregg et al., IBM Techical Disclosure Bulletin, 32(9A); 273-276, (1990).

Coppieters, "A Cross-Platform Binary Diff", Dr. Dobb's Journal, 34-36, May 1995.
Lekatsas et al., "Code Compression for Embedded Systems", Proceedings fo the 35th Design Automation Conference, 1998, Jun. 1998, 6 pages, San Francisco, CA.
Lynch et al., "Patch Graphs: an Efficient Data Structure for Completion of Finitely Presented Groups", Proceedings of the 3rd International AISMC Conference, lecture Notes in Computer Science, 1996, vol. 1138, 15 paqes, Sprinqer Verlaq, United Kinqdom.
MacDonald et al., "PRCS: The Project Revision Control System", lecture Notes in Computer Science, 1998, vol. 1439,14 pages, University of California at Berkeley, National Energy Research Scientific Computing Center, Springer Verlag, United Kingdom.
Microsoft PressPass, News Press Release, May 14, 1997,2 pages, Microsoft Corp., Redmond, WA2 pages.
Miller et al., "A File Comparison Program", Software—Practice and Experience, Nov. 1985, vol. 1'5 (11), pp. 1025-1040, Wiley Interscience, United Kingdom.
Batalden et al., IBM Technical Disclosure Bulletin, "Maintainable ROS Code Through the Combination of ROM and EEPROM," 32(9A); 273-276, (1990).
Percival, Wadham College University of Oxford, Thesis submitted for the degree of Doctor of Philosophy, Hilary-2006.
Baker et al., "Compressing Differences of Executable Code", 10 pages, Apr. 22, 1999.
http://msdn.microsoft.com/en-us/library//bb267312(VS.85,printer). aspx., dated Jan. 2006.
Lefurgy et al., "Improving Code Density Using Compression Techniques", 10 pages, 1997.
Hunt et al., "Delta Algorithms: An Empirical Analysis", ACM Transactions on Softward Engineering and Methodology, 7(2); 192-214 (1998).
Wang et al., Microsoft Research Technical Report: MSR-TR-99-83, Accepted to 2nd Annual Workshop on Feedback—Directed Optimization (FDO), Haifa, Israel, Nov. 15, 1999, 11 pages.
Burns et al., "In-Place Reconstruction of Delta Compressed Files" pp. 267-275 (1998).
http://www.ddj.com/article/printableArticle.
jhtml?articleID=1844095508&dept_url=/architect, Dr. Dobb's, A Cross-Platform Binary Diff (1995).
Hunt et al., "An Algorithm for Diffemetial File Comparison", Bell Laboratories, 9 pages, Jul. 1976.
Bums, "Differential Compression: A Generalized Solution for Binary Files", Dec. 1996, 69 pages.
Horwitz, "Identifying the Semantic and Textual Differences Between Two Versions of a Program", University of Wisconsin-Madison, 13 pages, 1990.
www.microsoft.com/presspass/press/1997/May97/ie4macpr.mspx.
Tichy, "The String-to-String Correction Problem with Block Moves", Purdue University, 17 pages, 1983.
Gregg et al., IBM Techical Disdosure Bulletin, 32(9A): 273-276, (1990).
Coppieters, "A Cross-Platform Binary Duff", Dr. Dobb's Journal, 34-36, May 1995.
http://code.google.com/p/xdelta/wiki/ExtemalCompression (earliest date Feb. 18. 2007).
http://code.google.com/p/xdelta/wiki/LanguageInerface (earliest date Feb. 8, 2007).
http://code.google.com/p/xdelta/wiki/LicensingXdelta (earliest date Mar. 24, 2007).
http://code.google.com/p/xdelta/wiki/ProgrammingGuide (earliest date Jan. 21, 2007).
http://code.google.com/p/xdelta/wiki/ProjectsUsingXdelta (earliest date Mar. 18, 2007).
http://code.google.com/p/xdelta/wiki/TumingMemoryBudget (earliest date Dec. 12, 2007).
http://code.google.com/p/xdelta, printed Dec. 18, 2009.
http://sourceforge.net/projects/xdelta, printed Dec. 18, 2009.
http://xdelta.org (earliest date Mar. 2, 2004).
http://msdn.microsoft.com/en-us/library//bb4173345(printer).aspx. (dated Oct. 2009).
International Search Report for PCT/IL99/00446, dated Dec. 12, 1999 (3 pages).

Lefurgy, Charles Robert, "Space-efficient Executable Program Representations for Embedded Microprocessors", Thesis, 1998, pp. 1-48, Ann Arbor, MI.

Lekatsas et al., "Code Compression for Embedded Systems", Proceedings to the 35th Design Automation Conference, 1998, Jun. 1998, 6 pages, San Francisco, CA.

Lynch et al., "Patch Graphs: an Efficient Data Structure for Completion of Finitely Presented Groups", Proceedings of the 3rd International AISMC Conference, lecture Notes in Computer Science, 1996, vol. 1138, 15 pages, Springer Verlaq, United Kingdom.

MacDonald et al., "PRCS: The Project Revision Control System", lecture Notes in Computer Science, 1998, vol. 1439, 14 pages, University of California at Berkeley, National Energy Research Scientific Computing Center, Springer Verlag, United Kingdom.

MacKenzie et al., "Comparing and Merging Files", ditt, diff3, sdiff, cmp, and patch, Edition 2.8, for diffutils 2.8 and patch 2.5.4, Mar. 23, 2002, pp. 1-100, Free Software foundation Ltd., Boston, MA.

Microsoft PressPass, News Press Release, May 14, 1997, 2 pages, Microsoft Corp., Redmond, WA2 pages.

Miller et al., "A File Comparison Program", Software—Practice and Experience, Nov. 1985, vol. 1'5 (11), pp. 1025-1040. Wiley Interscience, United Kingdom.

Japanese Office Action dated Nov. 28, 2006, with translation.

Hunt at al., "An Empirical Study of Delta Algorithms", University of Karlsruhe and AT&T Research, pp. 49-65, 1996.

IBM Corp., "Logging Status Information While Installing New Software", Jun. 1991, vol. 34, No. 1, one page.

James J. Hunt et al., "Distributed Configuration Management via Java and the World Wide Web", University of Karlsruhe, Germany, 1997.

Ajila, Samuel, "Software Maintenance: An Approach to Impact Analysis of Objects Change", Software Practice and Experience, Oct. 1995, vol. 25, pp. 1155-1181, John Wiley & Sons, Ltd., United KinQdom.

Ajmani, Sameer, "A Review of Software Upgrade TeChniques for Distributed Systems", MIT Computer Science and Artificial Intelligence Laboratory, Aug. 7, 2002, pp. 1-19, Cambridge, MA.

Baker, Brenda, "A Program for Identifying Duplicated Code", Computing Science and Statistics, 24th Symposium, Mar. 18-21, 1992, vol. 24, 9 pages, College Station, TX.

www.daemonology.net/bsdiff, (Jul. 6, 2006 (based on web.archive.org/web/20060706151336/http://www.daemonology.net/bsdiff/)).

Percival, "Naive Differences of Executable Code", 3 pages (dated 2003 (based on www.daemonology.net/papers)).

http://msdn.microsoft.com/en-us/library//bb267312(VS.85,printer).aspx, dated Jan. 2006.

Hunt et al., "An Algorithm for Diffrenetial File Comparison", Bell Laboratories, 9 pages, Jul. 1976.

Pandey et al., "Providing Fine-Grained Access Control for Mobile Programs Through Binary Editing", University of California, Technical Report TR-98-08, 22 pages, Form OMB No. 0704-0188 report date 1998.

http://code.google.com/p/xdelta/WIKI/BetterCompression, (earliest date Jan. 28, 2007).

http://code.google.com/p/xdelta/wiki/CommandLineSyntax, (earliest date Jan. 21, 2007).

http://code.google.com/p/xdelta/downloads/list?can=1&q=&colspec=Filename+Summary+Upload, (earliest date Dec. 2006).

http://code.google.com/p/xdelta/wiki/ExternalCompression (earliest date Feb. 18, 2007).

http://code.google.com/p/xdelta/wiki/LanguageInerface, earliest date Feb. 8, 2007.

http://code.google.com/p/xdelta/wiki/LicensingXdelta, (earliest date Mar. 24, 2007).

Prosecution History of U.S. Patent No. 6,546,552, filed Aug. 18, 1999, issued Apr. 8, 2003.

James J. Hunt et al., "Distributed Configuration Management via Java and the World Wide Web", University of Karlsruhe, Germany, 1997.

Houlder et al., "XOR Commands on SCSI Disk Drives", Seagate Technology, pp. 1-30, 1995.

Hunt et al., "An Empirical Study of Delta Algorithms", University of Karlsruhe and AT&T Research, pp. 49-65, 1996.

* cited by examiner

FIG. 3A

```
print "world"
print "\n"
print "world"
print "\n"
end
```

FIG. 3B

```
07e0                              ORG $7eo
07e0 8e 07 f9                     LDX #world
07e3 bd 08 01                     JSR print
07e6 8e 07 ff                     LDX #nl
07e9 bd 08 01                     JSR print
07ec 8e 07 f9                     LDX #world
07ef bd 08 01                     JSR print
07f2 8e 07 ff                     LDX #nl
07f5 bd 08 01                     JSR print
07f8 39                           RTS
07f9 77 6f 72 6c 64    world:     fcc "world"
07fe 00                           fcb 0
07ff 0a 00             nl:        fcb 10,0
0801 86 5a             print:     LDA #90
0803 3f                           SWI
0804 39                           RTS
```

FIG. 3C

8E07F9BD8018E07FFBD0801E07F9BD08018E07FFBD080139776F726C64000A0086 5A3F39

FIG. 4A

```
print "hi"      //single change
print "\n"
print "world"
print "\n"
end
```

FIG. 4B

```
07e0                              ORG  $7e0
07e0 8e 07 f9                     LDX  #greet
07e3 bd 08 04                     JSR  print
07e6 8e 08 02                     LDX  #nl
07e9 bd 08 04                     JSR  print
07ec 8e 07 fc                     LDX  #world
07ef bd 08 04                     JSR  print
07f2 8e 08 02                     LDX  #nl
07f5 bd 08 04                     JSR  print
07f8 39                           RTS
07f9 68 69            greet:      fcc  "hi"
07fb 00                           fcb  0
07fc 77 6f 72 6c 64   world:      fcc  "world"
0801 00                           fcb  0
0802 0a 00            nl:         fcb  10,0
0804 86 5a            print:      LDA  #90
0806 3f                           SWI
0807 39                           RTS
```

FIG. 4C

```
8E07F9BD08048E0802BD08048E07FCBD08048E0802BD0B0439686900776F726C64000
A00865A3F39
```

*FIG. 8*

```
ASSEMBLY LANGUAGE              MACHINE LANGUAGE
        ORG    $7E0                                    ─950
        LDX    #world         07e0   8e      07 f9
        JSR    print          07e3   bd      08 01
        LDX    #nl            07e6   8e      07 ff
        JSR    print          07e9   bd      08 01
        LDX    #world         07ec   8e      07 f9
        JSR    print          07ef   bd      08 01
        LDX    #nl            07f2   8e      07 ff
        JSR    print          07f5   bd      08 01
        RTS                   07f8   39
world:  fcc    'world'        07f9   77      6f 72 6c 64
        fcb    0              07fe   00
nl:     fcb    10,0           07ff   0a      00
print:  LDA    #90            0801   86      5a
        SWI                   0803   3f
        RTS                   0804   39
```

850

| RELATIVE INDEX | ABSOLUTE ADDRESS |
|---|---|
| 1 | 07F9 |
| 2 | 07FF |
| 3 | 0801 |

870

TABLE LIST: 1:07F9, 2:07FF, 3:0801

871

FIG. 10A
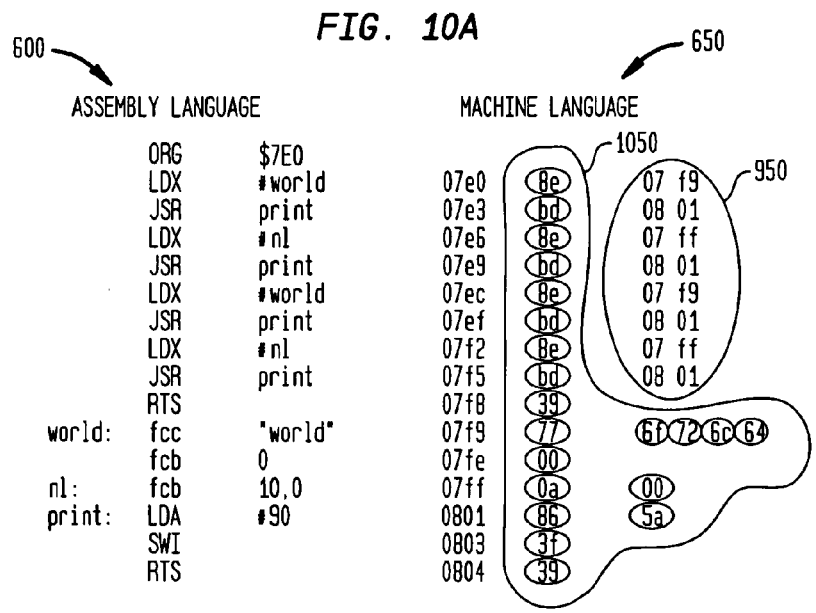
FIG. 10B
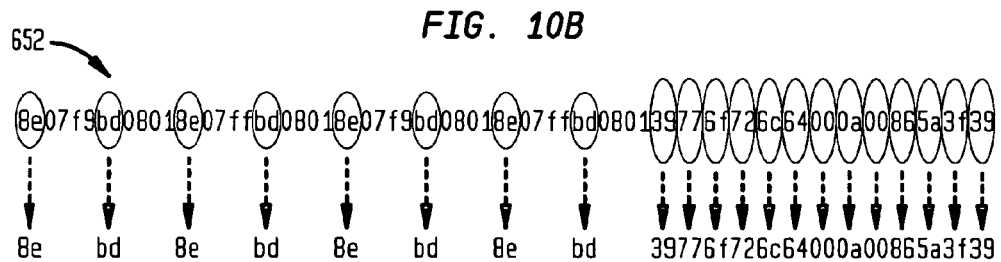
FIG. 10C
BYTE LIST: 8ebd8ebd8ebd8ebd39776f726c64000a00865a3f39

```
ASSEMBLY LANGUAGE              MACHINE LANGUAGE
        ORG    $7E0
        LDX    #world          07e0   8e    07 f9
        JSR    print           07e3   bd    08 01
        LDX    #nl             07e6   8e    07 ff
        JSR    print           07e9   bd    08 01
        LDX    #world          07ec   8e    07 f9
        JSR    print           07ef   bd    08 01
        LDX    #nl             07f2   8e    07 ff
        JSR    print           07f5   bd    08 01
        RTS                    07f8   39
world:  fcc    "world"         07f9   77    6f 72 6c 64
        fcb    0               07fe   00
nl:     fcb    10,0            07ff   0a    00
print:  LDA    #90             0801   86    5a
        SWI                    0803   3f
        RTS                    0804   39
```

1170 control list: brbrbrbrbrbrbrbrbrbbbbbbbbbbbbbb

| | |
|---|---|
| | ALTERNATE REPRESENTATION OF BASE VERSION |
| 1170 | CONTROL LIST: brbrbrbrbrbrbrbrbrbbbbbbbbbbbbbbb |
| 1070 | BYTE LIST: 8ebd8ebd8ebd8ebd39776f726c64000a00865a3f39 |
| 870 | TABLE LIST: 1:07F9, 2:07FF, 3:0801 |
| 970 | INDEX LIST: 1, 3, 2, 3, 1, 3, 2, 3 |

| | |
|---|---|
| | ALTERNATE REPRESENTATION OF UPDATED VERSION |
| 1350 | CONTROL LIST: brbrbrbrbrbrbrbrbrbbbbbbbbbbbbbbbb |
| 1360 | BYTE LIST: 8ebd8ebd8ebd8ebd39686900776f726c64000a00865a3f39 |
| 1370 | TABLE LIST: 1:07F9, 2:07FC, 3:0802, 4:0804 |
| 1380 | INDEX LIST: 1, 4, 3, 4, 2, 4, 3, 3 |

SYSTEM AND METHOD OF UPDATING PROGRAMS AND DATA

BACKGROUND OF THE INVENTION

FIGS. 3A-3C provide an example of a version of software in three different formats. For example, FIG. 3A illustrates the source code version of the software as written by a programmer in the BASIC programming language. The program prints the word "world" twice, each followed by an instruction to move to a new line. FIG. 3B illustrates the same version in a compiled, assembly language code format using the instructions set for the popular Motorola 6809 processor; the processor uses numbers to identify the operations it will perform and the assembly language version show what those operations are (e.g., the byte "8e" is a number value that instructs the processor to load a value in the X register ("LDX")). Finally, FIG. 3C illustrates the same base version in a compiled, machine language code format that is suitable for execution by the 6809 processor. In other words, a programmer may write in the software in source code. The source code is later "compiled" into machine code, e.g., a collection of values whose operation is somewhat difficult for humans to decipher. Assembly language makes it easier for humans to ascertain the functions of the machine code (software may also be written in assembly language).

Many software providers routinely update their software, making changes that may range from relatively minor to dramatically different. In that regard, FIGS. 4A-4C illustrate the corresponding formats for an updated version of the software shown in FIGS. 3A-3C. For example, FIG. 4A illustrates how a programmer may have updated the source code version of the software shown in FIG. 3A. The updated version contains instructions to print the word "hi" followed by an instruction to move to a new line, and to thereafter print the word "world" followed by a move to another new line.

In other words, the only difference between the updated version of the software (FIG. 4A) and the prior version of the software (FIG. 3A) (hereafter, the "base" software) is that the source code of the updated version prints the word "hi" instead of the first instance of printing the word "world".

Many software providers do not resend the entire new version of a program to their end users. One typical reason is that the programmers may have relatively minor changes to an otherwise large program. Accordingly, rather than sending an entirely new version to their end users, the provider may send a patch instead. A patch is typically a small program that represents the differences between the base and updated versions as well as instructions for making the changes. (A patch may also include only the changes if a program for installing the changes is already available on the end user's computer.) When executed by the end user's computer, the patch modifies the machine code of the base version so that it matches the updated version.

However, FIG. 5 illustrates that even a minor update of the base version software that simply replaces a single occurrence of the word "world" with the word "hi", results in numerous differences throughout the corresponding machine code formats. For example, FIG. 5 shows a part 52 of the base version in machine code format (from FIG. 3C) and a part 54 of the corresponding updated version of the software (from FIG. 4C). As can be seen by the circled portions, the updated version shows numerous bytes that are either different from or not included in the base version.

Thus, generating a patch for creating the updated version of the software in the machine code format from the corresponding base version would result in a patch that is relatively large.

The size and efficiency of patches can be important considerations with respect to patches. For example, if a patch is sent over a network, such as the Internet or a cell phone network, the speed of the network may delay the delivery of a large patch. Moreover, some devices such as cell phones may have a relatively small amount of memory, which can also militate in favor of keeping patches small.

BRIEF SUMMARY OF THE INVENTION

One aspect of the invention provides a method of generating a patch. The method includes converting a first version of a program into a first representation, the first representation distinguishing between first references and first non-references, where the first references are portions of the first version that refer to other portions of the first version and where the first non-references are portions of the first version that do not refer to other portions of the first version; converting a second version of the program into a second representation where portions of the second version are the same as the first version and where portions of the second version are the different than the first version, the second representation distinguishing between second references and second non-references, where the second references are portions of the second version that refer to other portions of the second version and where the second non-references are portions of the second version that do not refer to other portions of the second version; modifying, using a processor, a portion of the second representation based on a comparison of the second references with the first references while retaining information to convert the second representation back into the second version; and generating a patch representing the differences between the first representation and the second representation.

Another aspect of the invention provides a system including a memory storing instructions and data, where the data includes a first version of a program and a second version of the program, and a processor to execute the instructions and to process the data. The instructions include: converting the first version of the program into a first representation, the first representation distinguishing between first references and first non-references, where the first references are portions of the first version that refer to other portions of the first version and where the first non-references are portions of the first version that do not refer to other portions of the first version; converting the second version of the program into a second representation where portions of the second version are the same as the first version and where portions of the second version are the different than the first version, the second representation distinguishing between second references and second non-references, where the second references are portions of the second version that refer to other portions of the second version and where the second non-references are portions of the second version that do not refer to other portions of the second version; modifying a portion of the second representation based on a comparison of the second references with the first references while retaining information to convert the second representation back into the second version; and storing, in the memory, a patch representing the differences between the first representation and the second representation.

Yet another aspect of the invention provides a method that includes: converting a first version of a program into a first representation, the first representation distinguishing between first references and first non-references, where the first references are portions of the first version that refer to other portions of the first version and where the first non-references are portions of the first version that do not refer to other portions of the first version; receiving a patch, the patch comprising information representing the differences between the first representation and a second representation of a second version of the program, the second representation distinguishing between second references and second non-references, where the second references are portions of the second version that refer to other portions of the second version and where the second non-references are portions of the second version that do not refer to other portions of the first version; creating, with a processor and based on the information in the patch, the second representation from the first representation; and converting the second representation into the second version of the program.

Another aspect of the invention provides a system that includes a first computer at a first node of a network, the first computer comprising a first memory storing a first set of instructions and a first processor that processes data in accordance with the first set of instructions; the first computer having access to a first version of a program. The system further includes a second computer at a second node of a network, the second computer comprising a second memory storing a second set of instructions and a second processor that processes data in accordance with the second set of instructions; the second computer having access to the first version of the program and having access to a second version of the program. The second set of instructions comprise: converting the first version of the program into a first representation, the first representation distinguishing between first references and first non-references, where the first references are portions of the first version that refer to other portions of the first version and where the first non-references are portions of the first version that do not refer to other portions of the first version; converting the second version of the program into a second representation where portions of the second version are the same as the first version and where portions of the second version are the different than the first version, the second representation distinguishing between second references and second non-references, where the second references are portions of the second version that refer to other portions of the second version and where the second non-references are portions of the second version that do not refer to other portions of the second version; modifying a portion of the second representation based on a comparison of the second references with the first references while retaining information to convert the second representation back into the second version; generating a patch representing the differences between the first representation and the second representation, and transmitting the patch to the first computer. The first set of instructions comprise: converting the first version of the program into the first representation; receiving the patch representing the differences between the first representation and the second representation; creating, based on the patch, the second representation from the first representation; and converting the second representation into the second version of the program.

BRIEF DESCRIPTION OF THE DRAWINGS

FIGS. 3A-3C provide an example of a base version of software in different formats.

FIGS. 4A-4C provide an example of an updated version of software in different formats.

FIG. 8 provides an example of creating a table list.

FIGS. 10A-10C provides an example of creating a byte list.

FIG. 12 provides an example of an alternate representation of the base version.

FIG. 13 provides an example of an alternate representation of the updated version.

DETAILED DESCRIPTION

Figure 1:
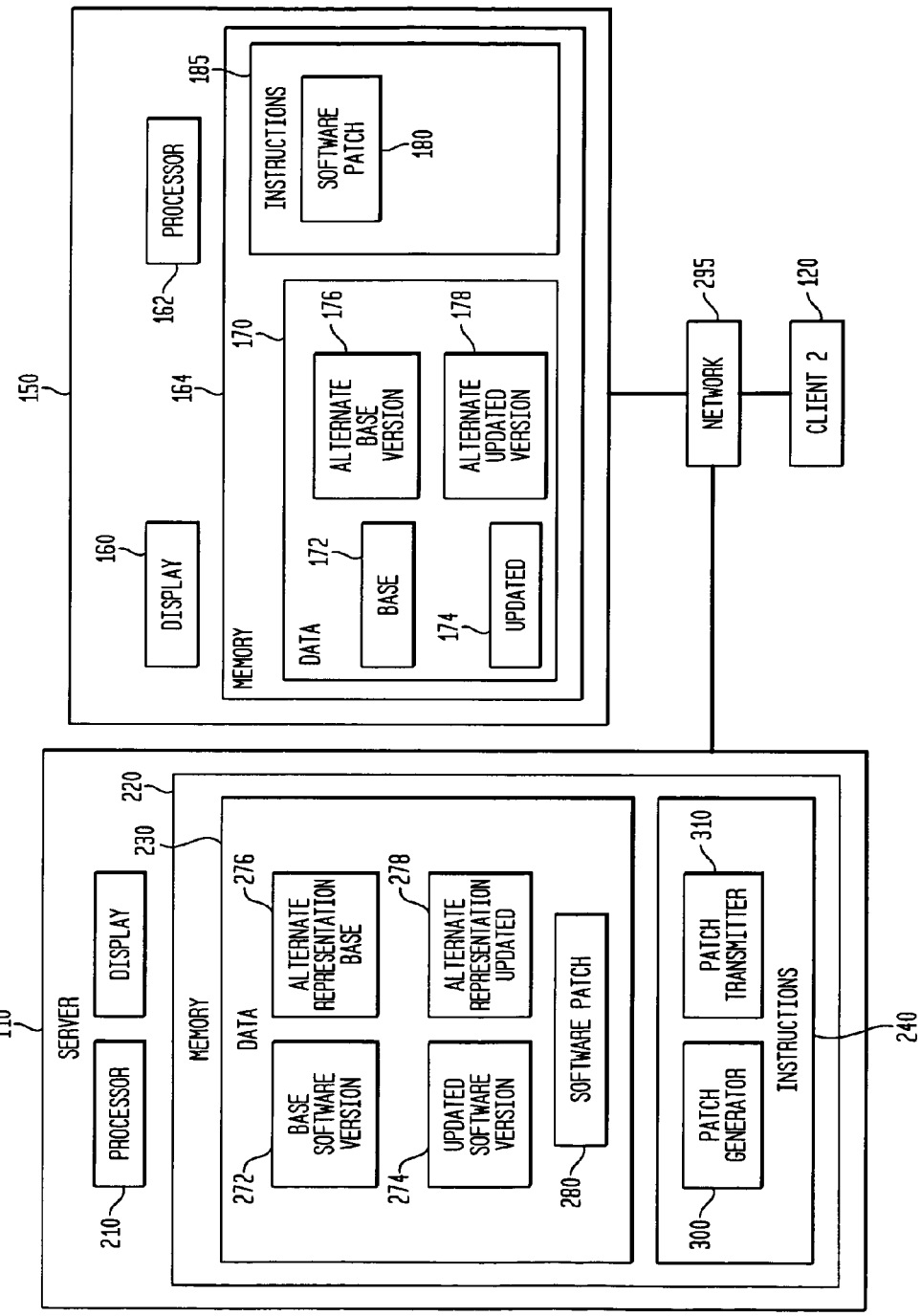
FIG. 1 is a block diagram of system components in accordance with an aspect of the system and method.
Figure 2:
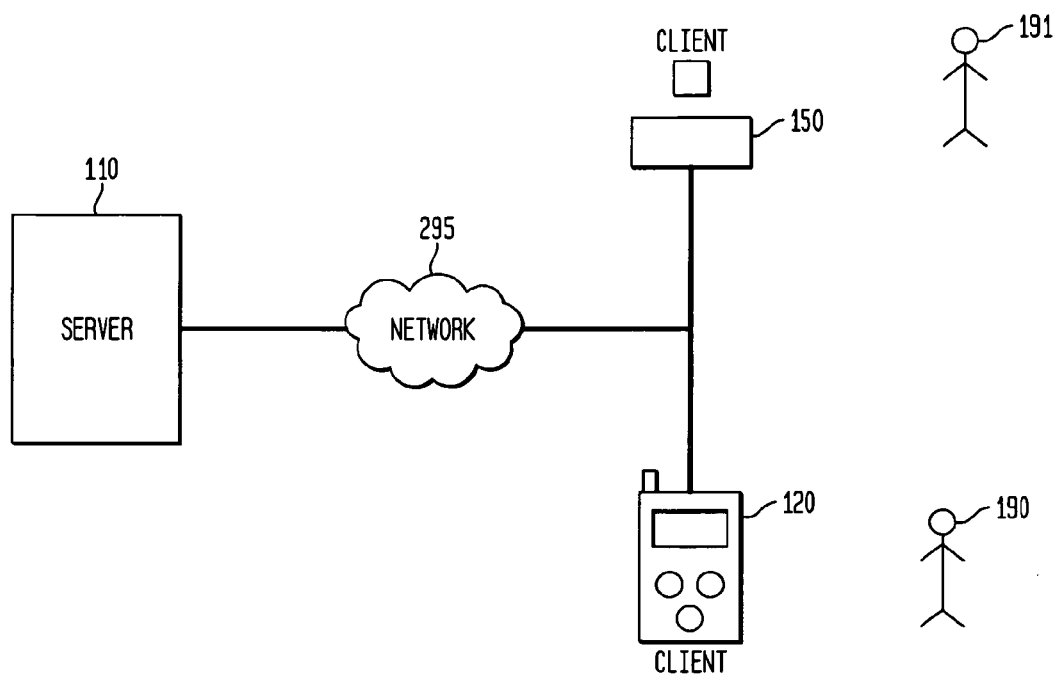
FIG. 2 is a schematic diagram of a system in accordance with an aspect of the system and method.
Figure 5:
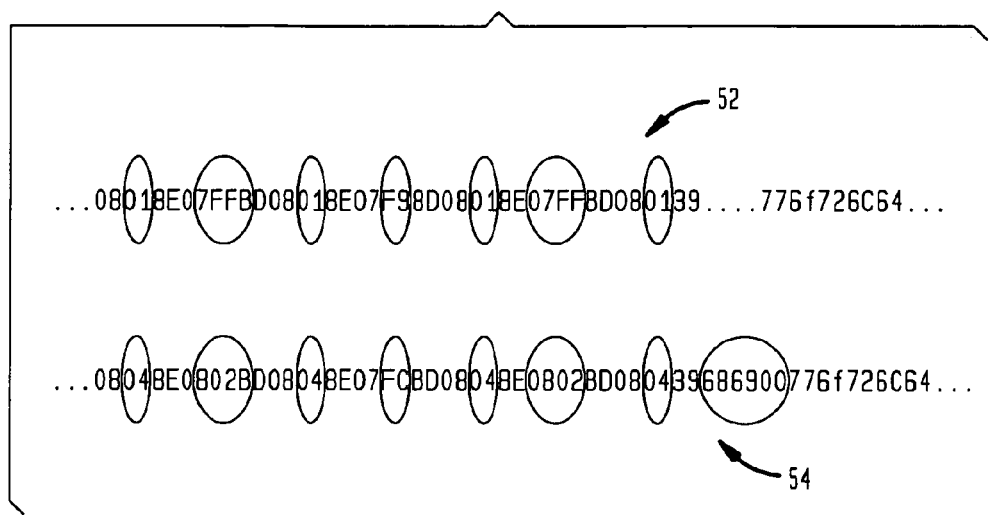
FIG. 5 illustrates the differences between a portion of the base version and the updated version resulting from a minor change in the software.

As shown in FIGS. 1-2, a system 100 in accordance with one aspect includes a computer 110 containing a processor 210, memory 220 and other components typically present in general purpose computers.

Memory 220 stores information accessible by processor 210, including instructions 240 that may be executed by the processor 210. It also includes data 230 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 210 may be any well-known processor, such as processors from Intel Corporation. Alternatively, the processor may be a dedicated controller such as an ASIC.

The instructions 240 may be any set of instructions to be executed directly (such as machine code) or indirectly (such as scripts) by the processor. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the system and method is not limited by any particular data structure, the data may be stored in computer registers, in a relational database as a table having a plurality of different fields and records, XML documents, or flat files. The data may also be formatted in any computer readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client computers 120, 150. Each client computer may be configured similarly to the server 110, with a processor, memory, and instructions. Each client computer 120, 150 may be a personal computer, intended for use by a person 190 191, having all the internal components normally found in a personal computer such as a central processing unit (CPU), display 160 (for example, a monitor having a screen, a projector, a touch-screen, a small LCD screen, a television, or another device such as an electrical device that is operable to display information processed by the processor), CD ROM, hard drive, user input device (for example, a mouse, keyboard, touch screen or microphone), speakers, modem and/or network interface device (telephone, cable or otherwise) and all of the components used for connecting these elements to one another and permitting them to communicate (directly or indirectly) with one another. Moreover, computers in accordance with the systems and methods described herein may comprise any device capable of processing instructions and transmitting data to and from humans and other computers including network computers lacking local storage capability.

Although the client computers 120 and 150 may comprise a full-sized personal computer, many aspects of the system and method are particularly advantageous when used in connection with mobile devices capable of wirelessly exchanging data with a server over a network such as the Internet. For example, client computer 120 may be a wireless enabled PDA such as a Blackberry phone or an Internet-capable cellular phone. In such regard, the user may input information using a small keyboard (in the case of a Blackberry phone), a keypad (in the case of a typical cell phone), a touch screen (in the case of a PDA) or any other means of user input.

The server 110 and client computers 120, 150 are capable of direct and indirect communication, such as over a network 295. Although only a few computers are depicted in FIGS. 1-2, it should be appreciated that a typical system can include a large number of connected computers, with each different computer being at a different node of the network 295. The network, and intervening nodes, may comprise various combinations of devices and communication protocols including the Internet, World Wide Web, intranets, virtual private networks, wide area networks, local networks, cell phone networks, private networks using communication protocols proprietary to one or more companies, Ethernet, WiFi and HTTP and various combinations of the foregoing. Such communication may be facilitated by any device capable of transmitting data to and from other computers, such as modems (e.g., dial-up or cable), network and wireless interfaces. Server 110 may be a web server.

Although certain advantages are obtained when information is transmitted or received as noted above, other aspects of the system and method are not limited to any particular manner of transmission of information. For example, in some aspects, information may be sent via a medium such as a disk, tape or CD ROM. In other aspects, the information may be transmitted in a non-electronic format and manually entered into the system. Yet further, although some functions are indicated as taking place on a server and others on a client, various aspects of the system and method may be implemented by a single computer having a single processor.

In one aspect, data 230 of server 110 stores different versions of software. For example, data 230 may store software 272 that is an older or base version, and software 274 that is a newer, updated version of software 272. It will be understood that portions of the older version of the software 272 and the updated version 274 each may contain instructions, operands, and data necessary for the software to function as intended. While the updated version 274 may include additional portions providing more functionality than base version 272, this is not a requirement. For example, another difference may be that portions of the updated version 274 may improve upon or correct the functionality provided by portions of the base version 272, or, in certain cases, the updated version 274 may even contain less functionality by not having certain portions of base version 272. It will also be understood that software versions 272 and 274 are not limited to any particular format, and may be developed using any programming language. For example, software versions 272 and 274 may be developed using a high-level processor independent programming language like C, C++, HTML, Perl, or Java, a low-level processor-dependent programming language such as assembly or machine language, or any combination thereof.

Memory 220 may also store a patch generator 300 that is executable by processor 210. Patch generator 300 may perform one or more of the following functions: create an alternate representation 276 of the base version 272; create an alternate representation 278 of the updated version 274; compare and modify portions of the alternate representation 278 of the updated version of the software to more closely match the alternate version 276 of the base version of the software; and create a patch 280. In one aspect, the patch 280, in turn, may be executed by a processor to create the alternate representation 278 of the updated version 274 from the alternate representation 276 of the base version 272.

Additionally, memory 220 may contain a patch transmitter 310. For example, patch transmitter 310 may be operable to transmit or send the patch 280 to the client devices 120, 150 over the network 295.

An exemplary operation in accordance with various aspects of the invention follows below. It should be understood that the following operations do not have to be performed in the precise order described below. Rather, various steps can be handled in reverse order or simultaneously.

In one aspect of the system and method, the patch generator 300 distinguishes between two different types of changes found in the updated version 274 of the software over the base version 272. One type of change relates to changes in references to locations, i.e., where one portion of the software references another portion of the software. The other type relates to all other changes. Yet another aspect of the system and method makes such distinctions by creating alternative representations of the base and updated versions of the software in accordance with, but not limited to, the following method.

Figure 6:
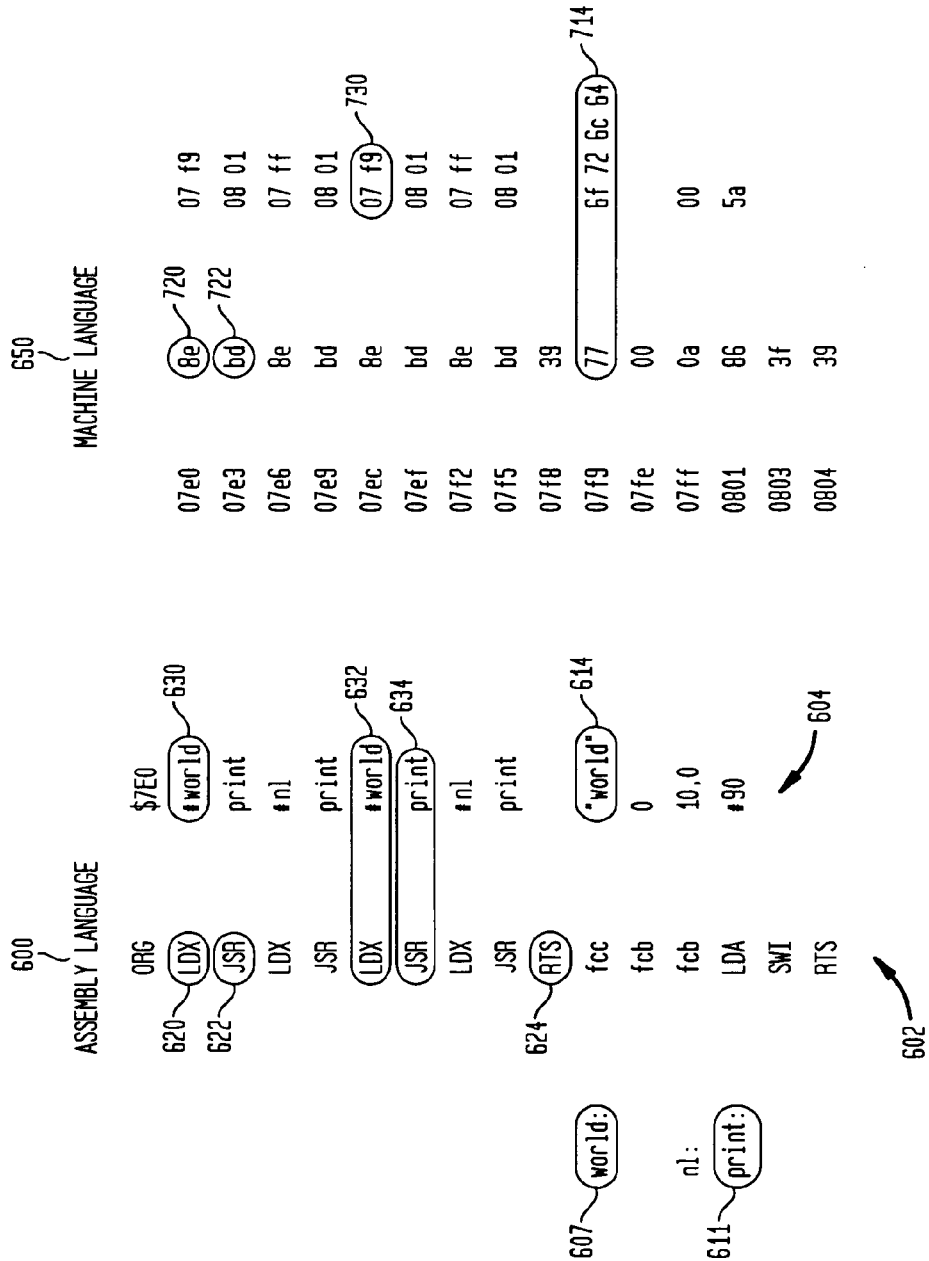
FIG. 6 provides an example of the various components of the assembly language and the machine language format.

As shown in FIG. 6, a computer program may include a series of operations 602, operands 604 and other data (the assembly language format 600 of the machine code 650 are both shown in the figure).

Operations 602 control the operation of a processor. For example, each particular type of operation in the series of operations 602 may be represented by one or more unique bytes. In that regard, when the processor receives the operation having the hexadecimal byte "8e" 720, the processor recognizes this as the "LDX" operation 620, i.e., an instruction to load data into the X register. Similarly, each "JSR" operation 622 may be uniquely represented by a hexadecimal byte "bd" 722.

Some operations act upon operands 604, and some operands 604 may be references to other locations in the software, such as locations storing other instructions or data. For example, "LDX #world" 632 instructs the processor to load the data stored at the address "07f9" (referenced by label 607) into a register X of the processor. Similarly, "JSR print" 634 instructs the processor to jump to the address "0801" (referenced by label 611) and to begin executing the instructions 616 at that address.

Not all operands are references to other locations. For example, an operand may comprise a specific number that will be added to another specific number.

Other operations 602 such as "RTS" 624, for example, may not operate on any operands and may be a complete instruction by itself.

Like the operations, the operands 604 may be represented by one or more bytes. This is so regardless of whether the operand refers to another location of the program or not. For example, the "LDX #world" 632 command instructs the processor to load two hexadecimal bytes "07 f9" 730 into the X register of the processor. Similarly, the data "world" 614 may be stored in the program as a series of hexadecimal bytes "77 6f 72 6c 64" 714.

Figure 7:
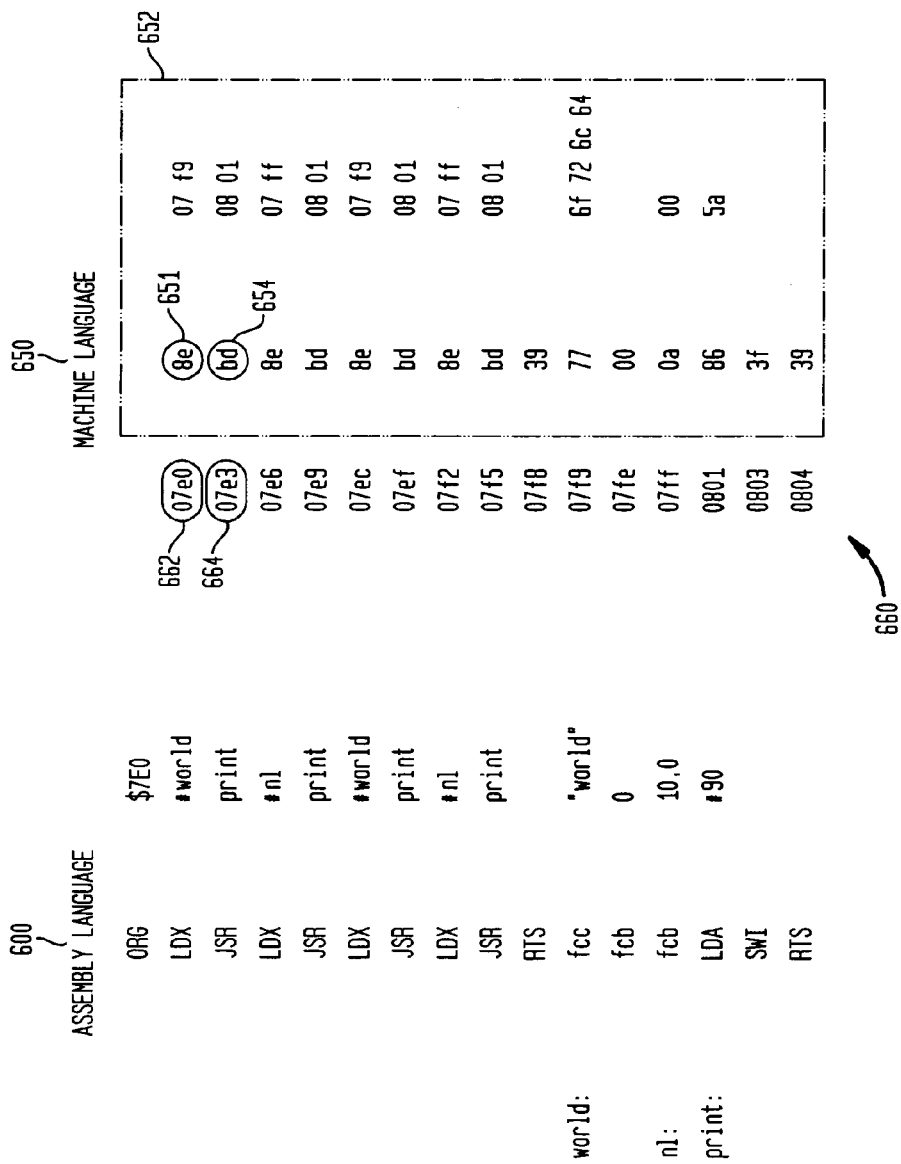
FIG. 7 provides a further description of the assembly language and the machine language format.

As seen in FIG. 7, each of the bytes 652 may be associated with a particular address in a series of consecutive addresses 660. Addresses 660 may be absolute addresses. Absolute addresses (also known as a specific addresses), may be a memory address that identifies a fixed location in memory. For example, instruction 651 is stored at memory location "07e0" and instruction 654 is stored at memory location "07e3". The operand of instruction 651, which is two bytes long, immediately follows instruction 651 at addresses "07e1" and "07e2" respectively (not shown).

In one aspect of the system and method, a processor analyzes the program to identify referenced locations. By way of example, the processor determines those portions of the program that are the targets of other portions of the program. These targets, in turn, may be assigned unique identifiers that are independent of their actual address location. For example, as shown in FIG. 8, each address that is referred to by other portions of the program, such as "07f9" (e.g., the instruction "LDX #world" at address "07e0" loads information from the address at location "07f9") and "0801" (e.g., the instruction "JSR print" jumps to the instruction at location "0801"), may be stored in a look-up table 850. Furthermore, each referenced address may be associated with a unique index. For example, as seen in table 850, referenced address "07f9" is assigned to index "1" and referenced address "07ff" is assigned to index "2".

The collection of referenced locations may be stored as a set or collection of characters. For example, entry "1:07f9" 871 in table list 870 may represent the assignment of index "1" to address "07f9" and entry "2:07ff" may represent the assignment of index "2" to absolute address "07ff".

In addition to identifying the target locations of the program, the processor may also identify the portions that point at those targets. These references to other portions are, in turn, associated with the unique identifiers that were associated with the targets. For example, the instruction "LDX #world" points to the data at address "07f9". The address "07f9" has, in turn, has already been associated with index value "1" in table 850. Accordingly, this and other references to "07f9" may be associated with the value of "1". Similarly, the instruction "JSR print" points to the data at address "0801", which has already been associated with index value "3" in table 850. Accordingly, this and other references to "0801" may be associated with the value of "3".

Figure 9:
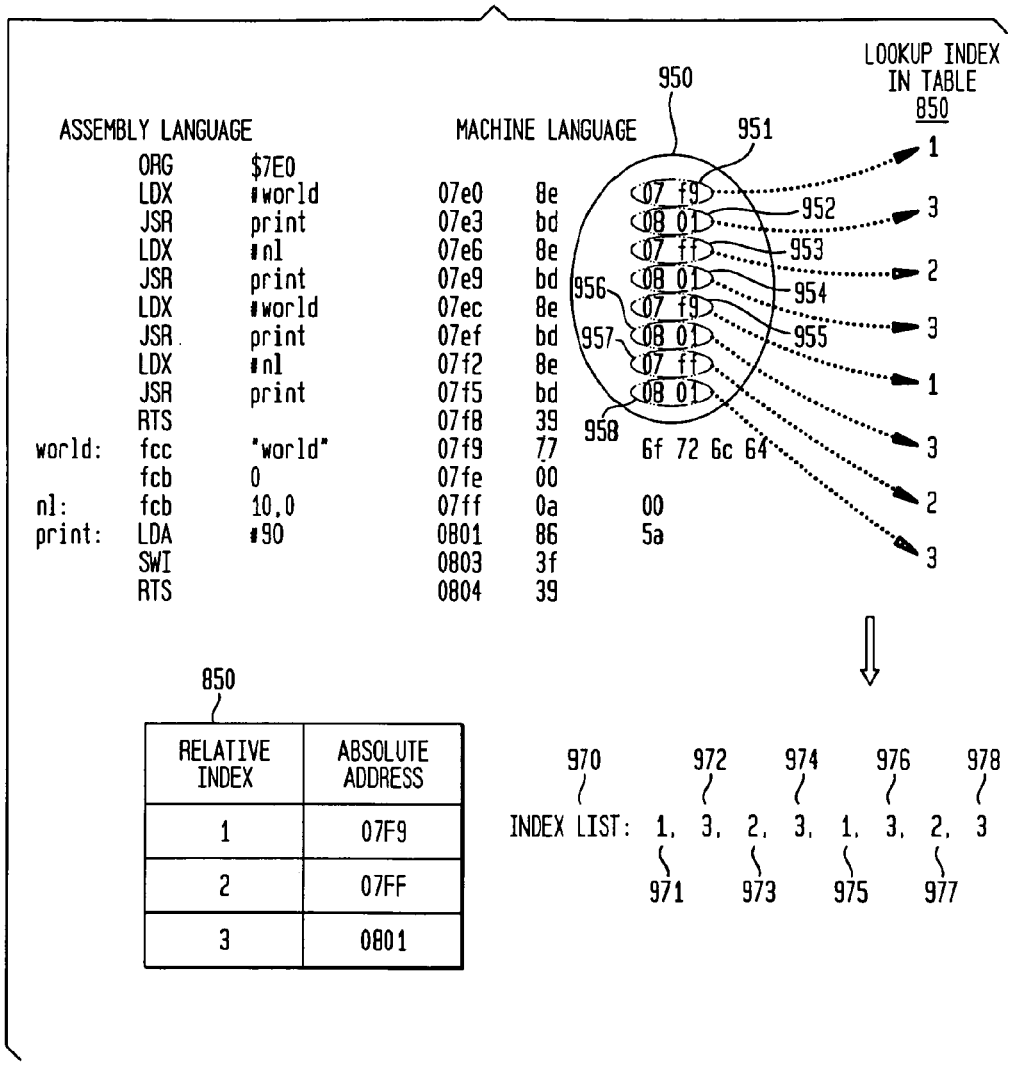
FIG. 9 provides an example of creating an index list.

The collection of referenced locations may be stored as a collection of characters. In one aspect, the collection is stored as an ordered list which corresponds with the order in which the references arose. For example, in addition to creating table list 870, an index list 970 (FIG. 9) may also be created. Index list 970 may be an ordered list of indexes, where the values of the indexes identify references found in one or more portions of the software, and where the order of the indexes (when read left-to-right, for example) represents the relative location of one reference with respect to other references in the software.

Thus, bytes "07 f9" 951 may be understood as the very first reference to another address or location in the software, and further may be understood to reference address "07f9". Accordingly, the first entry in the index list 970 may be determined to be the index "1" 971, based on its assignment to address "07f9" in table 850. Similarly, bytes "08 01" 952 may be understood as the next and second reference to another address or location in the software, and further may be understood to reference address "0801". Thus, the second entry in the index list 970 may be determined to be the index "3" 972, based on its assignment to address "0801" in table 850. A similar approach may be taken for each of the subsequent bytes understood to be references to other locations or addresses in the software (i.e., 953-958 in FIG. 9). In like manner, a complete index list 970 (i.e., 971-978), may be created where each entry represents a reference to another location in the software and its relative location to other references.

The processor may also store information that identifies the values of the program that do not correspond with references. For example and as shown in FIG. 10A, the processor may identify the portions 950 of the software that are references to other locations relative to other portions 1050 (hereafter referred to as "non-references").

FIG. 10B shows the same bytes as those shown in the machine code 650 of FIG. 10A, except it arranges the bytes 652 consecutively from left-to-right in the order in which they are found in the program. For example, the processor may extract the portions that are non-references (the non-references are circled) and place them in an ordered list of bytes 1070 shown in FIG. 10C. Byte list 1070 thus recites, reading from the left to the right, a list of the bytes that are not references and does so in the order in which the bytes are found in the software.

Figures 11A, 11B, 11C:
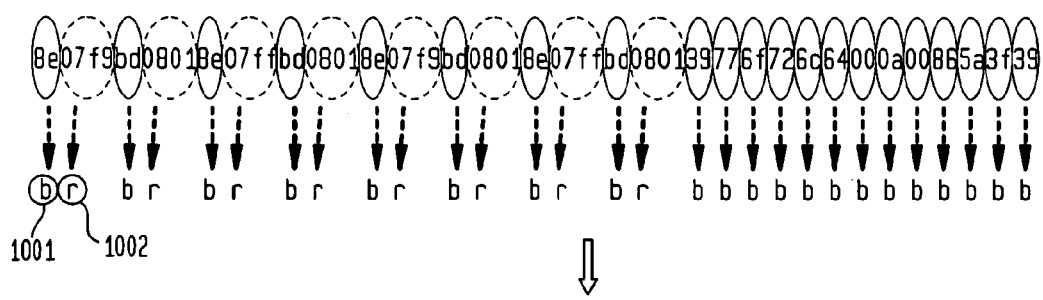
FIGS. 11A-11C provides an example of creating a control list.

The processor may also store information that identifies the order and quantity of references relative to non-references. For example and as shown in FIGS. 11A and 11B the processor distinguishes between references and non-references as described above. The individual bytes of non-references are shown encircled in solid circles and the bytes associated with references are encircled with dashed circles. As shown in FIG. 11B, each non-reference byte may be associated with the letter "b". For example, the first byte "8e" is designated with letter "b" 1001 because it is associated with an operation ("LDX") instead of a reference. Similarly, bytes that are understood as references are designated with a letter "r". For example, the first reference "07f9" is designated with letter "r" 1002. In like manner, the subsequent bytes are designated with a "r" or an "b" depending upon whether the bytes are references or not-references respectively.

A final ordered list 1170 (a "control list") is shown in FIG. 11C. As can be seen reading from left-to-right, ordered control list 1170, contains the list of designation "b" and "r" in the order they are found in the software.

The aforementioned analysis results in an alternative representation of the program. For example, as shown in FIG. 12, the control list 1170, byte list 1070, table list 870, and index list 970 collectively define an alternate representation 276 of the base version 272.

An alternate representation 278 of the updated version 274 may be similarly created. As shown in FIG. 13, for example, the alternate representation 278 may also include a control list 1350, a byte list 1360, a table list 1370, and an index list 1380.

Figure 14:
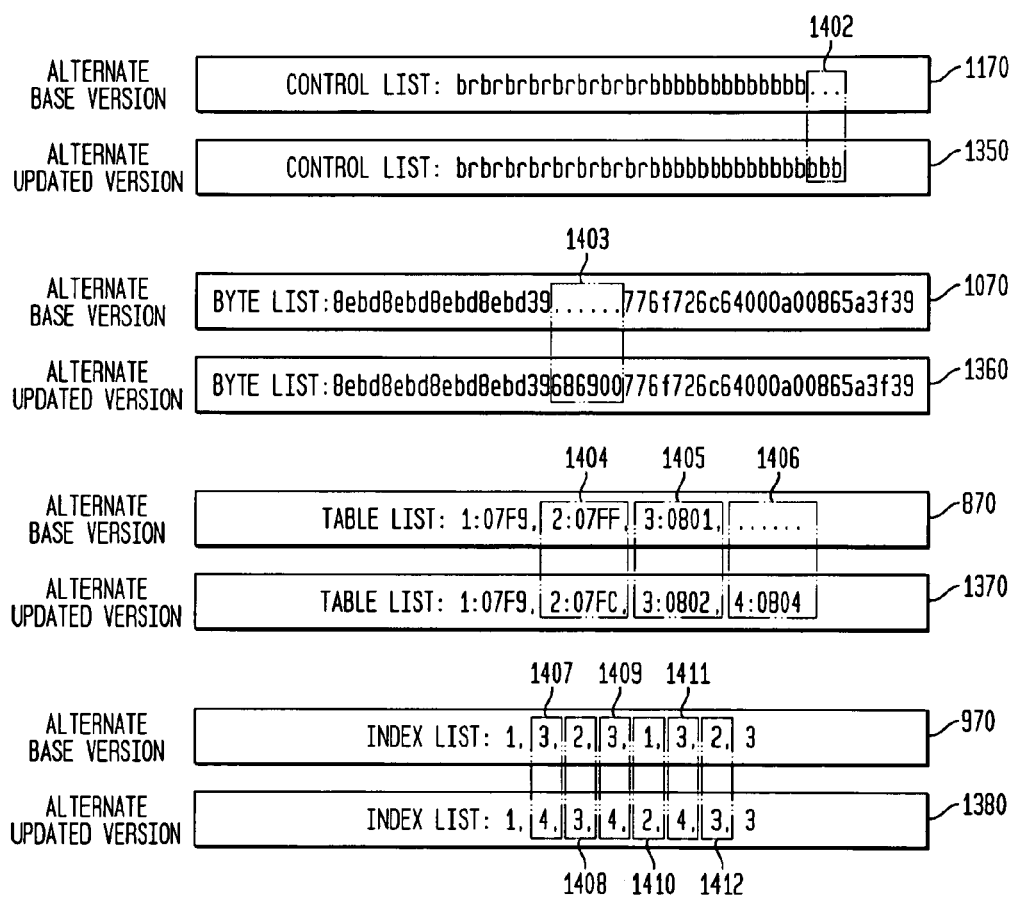
FIG. 14 provides an example of locating absolute addresses or references to locations.

In one aspect, the system and method may compare the differences between the alternate representation 276 of the base version and the alternate representation 278 of the updated version. As shown in FIG. 14, each corresponding list in the two alternate representations may be compared and differences identified.

Accordingly, control list 1350 of the alternate representation of the updated version may be compared with control list 1170 of the alternate representation of the base version. As can be seen, the control list 1350 of the alternate representation of the updated version is identical to the control list 1170 of the alternate representation of the base version, with the exception of three additional entries at the end (highlighted by box 1402) that are not in control list 1170 of the alternate representation of the base version.

Similarly, byte list 1360 of the alternate representation of the updated version may be compared with byte list 1070 of the alternate representation of the base version. As can be seen, the byte list 1360 of the alternate representation of the updated version is identical to the byte list 1070 of the alternate representation of the base version, with the exception of three additional entries "68", "69", and "00" (highlighted by box 1403) in the middle of byte list 1360 that are not found in the byte list 1070 of the alternate representation of the base version.

Likewise, table list 1370 of the alternate representation of the updated version may be compared with table list 870 of the alternate representation of the base version. As can be seen, the table list 1370 of the alternate representation of the updated version differs from the table list 870 of the alternate representation of the base version in two respects. First, table list 1370 has an additional fourth entry, highlighted by box 1406, whereas table list 870 only has three entries. Second, the respective second and third entries in the two table lists, highlighted by boxes 1404 and 1405 respectively, have different values and are thus different.

Lastly, index list 1380 of the alternate representation of the updated version may be compared with index list 970 of the alternate representation of the base version. As can be seen, the index list 1380 of the alternate representation of the updated version has the same number of entries as in index list 970, but the values of many of the entries are different between the index list 1380 and index list 970. In particular, with the exception of the first and last respective entries in index list 1380 and index list 970, all of the remaining entries highlighted by boxes 1407-1412, are different between the two index lists.

In one aspect, the system and method may modify certain portions of the alternate representation 278 of the updated version, without changing its accurate representation of the original updated version, in order to reduce the number of differences between it and the alternate representation 276 of the base version as described below.

In accordance with the specific aspects described above, a table list may represent the assignment of a particular index to a unique referenced address found in the software. As also described earlier, an index list may represent an ordered list of indexes, where the values of the indexes identify particular references found in one or more portions of the software, and where the order of the indexes (when read left-to-right) represents the relative order in which the referenced addresses are found in the software. The assignment of indexes to unique reference addresses, and the creation of an ordered index list representing the relative location and the identity of references in the software, together provide a degree of freedom in the values used in the alternate representations.

Specifically, the table list may be modified by changing the index numbers that are assigned to the unique reference addresses determined from the software. Concomitant changes may also be made in the index list to reflect these changes. Such modifications may be performed for the purpose of reducing the number of differences between the alternate representation of the updated version and the alternate representation of the base version.

Figure 15:
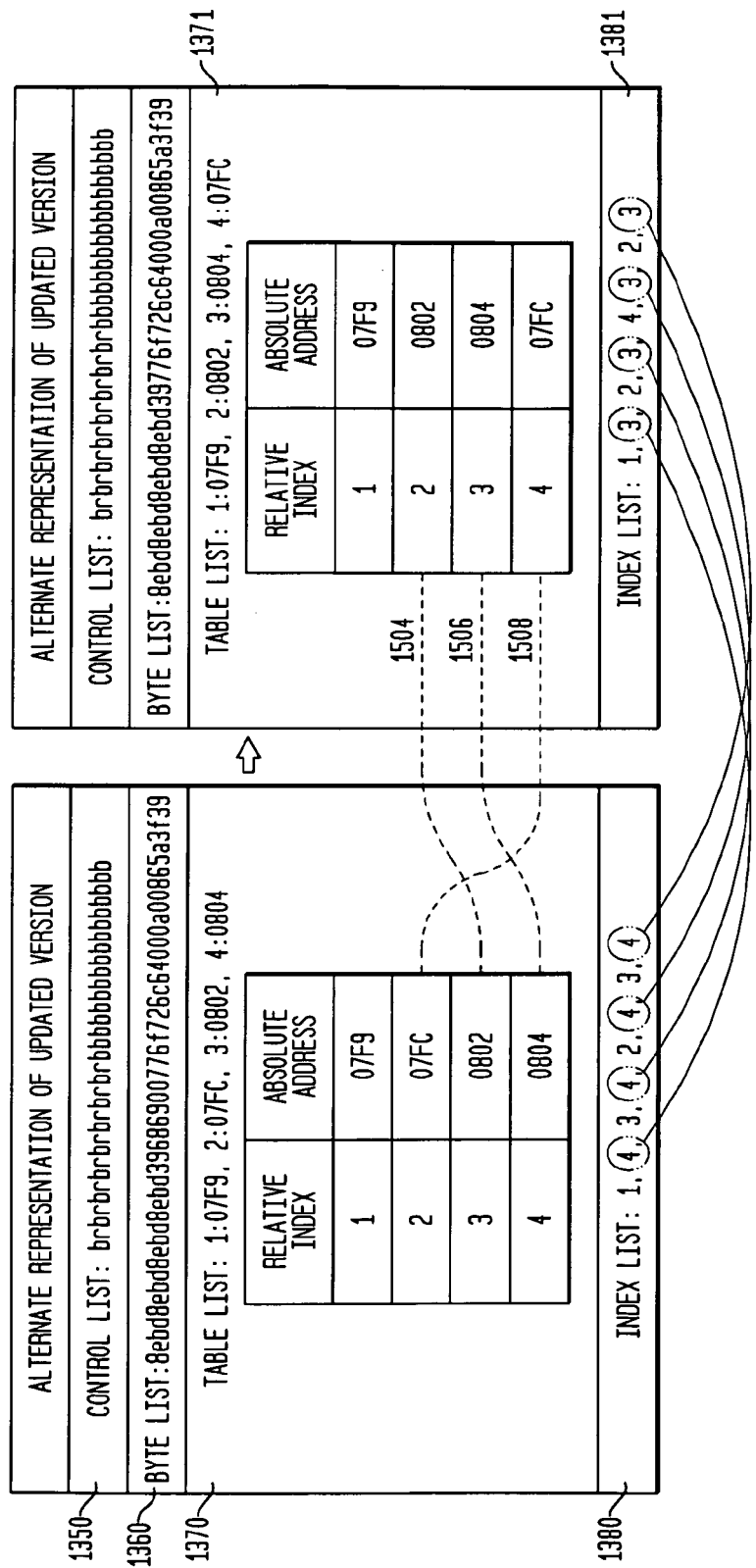
FIG. 15 provides an example of comparing the alternate representation of the updated version with the alternate representation of the base version.

For example, table list 1370 in FIG. 15 shows the original table list of the updated version of the software. As can be seen in table list 1370, index "1" is associated with address "07f9", index "2" is associated with address "07fc", index "3" is associated with address "0802", and index "4" is associated with address "0804".

The processor may change the indexes that are assigned to the addresses. As can be seen in modified table list 1371 and represented by arrows 1504, 1506 and 1508, index "2" may be reassigned to address "0802", index "3" may be reassigned to address "0804", and index "4" may be reassigned to address "07fc". Index "1" may remain as is.

FIG. 15 also shows a modified index list 1381 that has been modified to reflect the new assignments and to maintain the identity and order in which the referenced addresses are found in the software. In particular, each previous entry "4" in index list 1380 representing the previous assignment of index "4" to address "0804" in table list 1370 has been replaced with an entry "3" (circled for ease of illustration) in modified index list 1381, to properly represent the change of assignment of address "0804" to index "3" in modified table list 1371. Similar changes are made to the other reassigned indexes.

Figure 16:
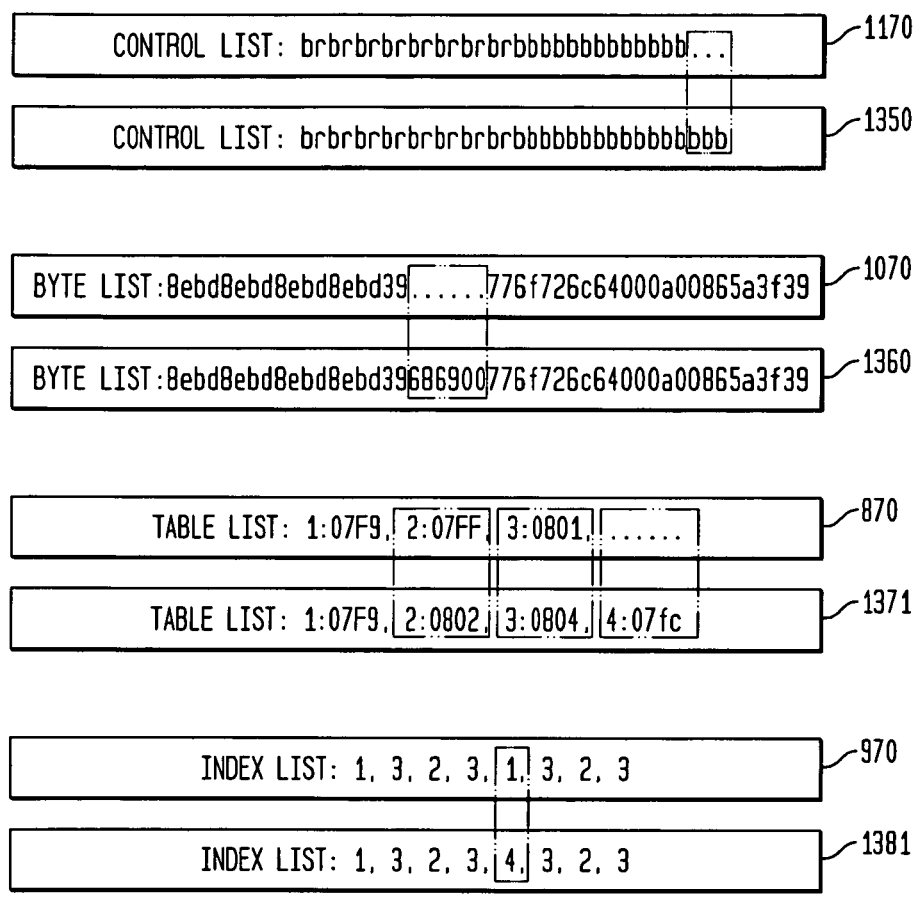
FIG. 16 provides an example of modifying the alternate representation of the updated version.

FIG. 16 illustrates the result of the modification of the alternate representation of the updated version as described above. In particular, it can be seen that the differences between the index list of the alternate representation of the base version and the corresponding index list of the alternate representation of the updated version have been reduced to just one difference identified by box 1602. In other words, FIG. 16 illustrates that there are fewer differences between the alternate representation of the base version and the alternate representation of the updated version than shown in FIG. 14. In a typical program comprising thousands of lines of code, the reduction of differences can be even more dramatic.

The alternate representation of the updated version may be converted back into the updated version. For example, the alternate representation 278 in FIG. 13 of the updated version may be converted into updated version 274 by substituting each entry in the control list 1350 with an appropriate entry from either the byte list or the table list.

Thus, each of the successive entries in the control list that are a "b" may be successively replaced with the corresponding entry from the byte list. For example, the first entry (reading from left-to-right) in control list 1350 is a "b", which may be replaced with the first entry in byte list 1360, which is "8e". Similarly, the second "b" in the control list, which is the third entry, may be replaced with the second byte in the byte list, which is "bd".

In addition, each of the successive entries in the control list that are an "r" may also be successively'replaced with an address from the table list 1370, where the address is identified by the appropriate successive index value in the index list. For example, the first "r" in the control list (second entry) may be replaced by the address indicated by the first entry of the index list 1380, which is a "1", and which, as seen from table list 1370, is assigned to address "07f9". Thus, the first "r" may be replaced by address "07f9". Similarly, the second "r" in the control list (fourth entry) may be replaced by the address indicated by the second entry into the index list "4", which is assigned to address "0804". Thus, the second "r" may be replaced by address "0804".

Thus, by replacing each entry of "b" and "r" in the control list as described above, the updated version may be reconstructed from its alternate representation.

In one aspect, the system and method creates a patch 280. The patch may include (1) instructions for creating an alternate of the base version, (2) the differences between the alternate base version and alternate updated version, (3) instructions for applying those differences to the alternate base version—so as to create an alternate updated version, and (4) and instructions for creating the updated version from the alternate.

Figure 17:
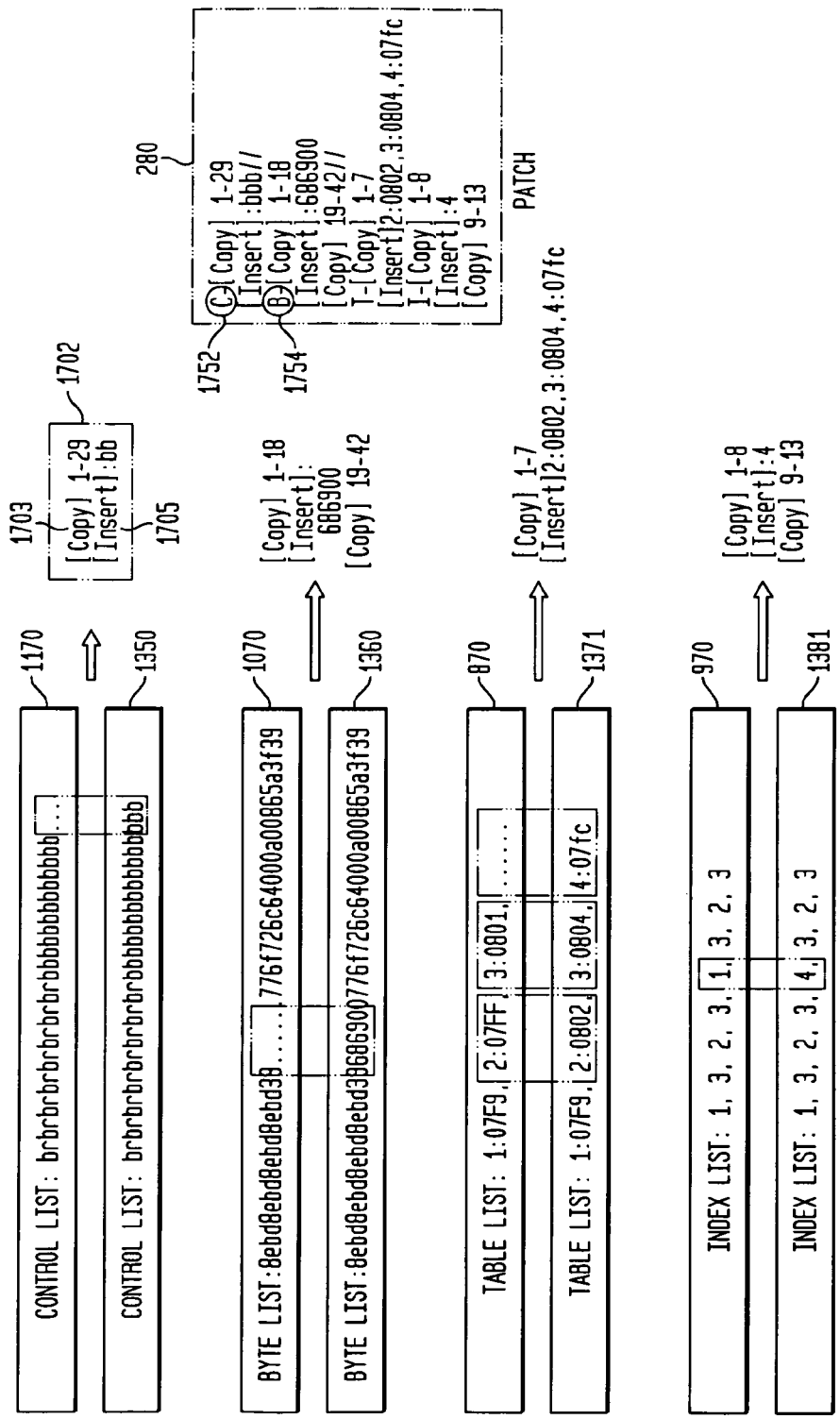
FIG. 17 provides an example of comparing the alternate representation of the updated version with the alternate representation of the base version.

For example, and as shown in FIG. 17, the system and method may create a patch 280. Patch 280 may include information 1702 that may be used to generate control list 1350 of the alternate representation of the updated version from control list 1170 of the alternate representation of the base version. In particular, information 1702 may include an ordered series of directives, where each of the directives may be performed in the order it is presented to generate control list 1350. For example, information 1702 may contain a directive 1703 indicating that the first step for generating updated control list 1350 from base control list 1170 is to copy the first 29 entries of control list 1170. Information 1702 may also include a directive 1705 to insert the entries "bbb" after copying the first 29 entries. Thus, the patch enables the creation of an updated control list 1350 from a base control list 1170.

In like manner, patch 280 may also include directives for generating the byte list, table list, and the index list of the alternate representation of the updated version from the corresponding lists of the alternate representation of the base version.

In addition, each set of directives for generating a respective list may be separated by a delimiter that may indicate the end of one set of directives and the beginning of the next. In addition, the delimiter may also identify the list associated with a set of directives. For example, delimiter 1752 indicates that the following set of directives applies to the control list. Similarly, delimiter 1754 indicates the beginning of directives for the byte list.

Moreover, a patch representing the differences between the alternate versions may be generated using conventional patch creation programs, such as by applying bsdiff or xdelta to the alternative base and alternative updated versions.

Patch 280 may be transmitted from server 110 to one or more clients 120, 150, which may use the information in the patch 280 to generate an updated version of the software 174 from the base version of the software 172.

Figure 18:
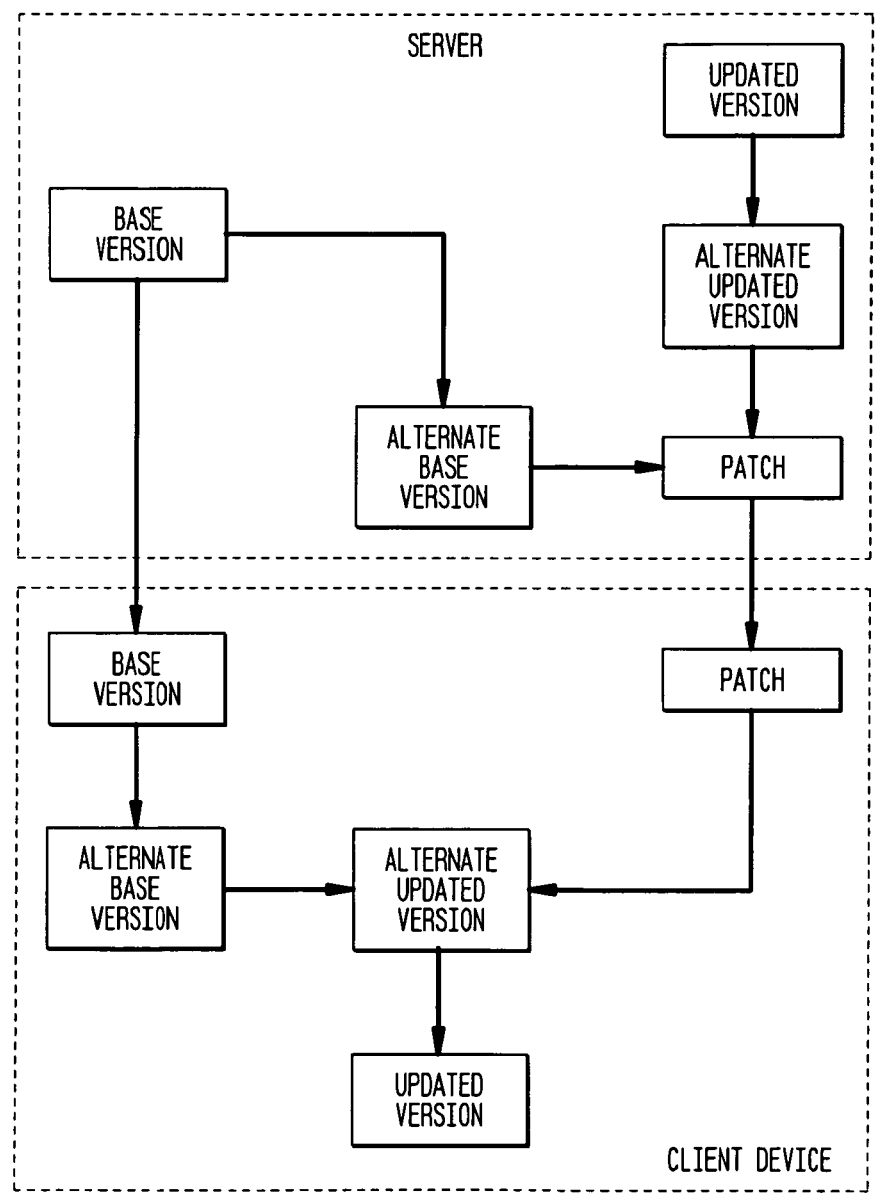
FIG. 18 is a flow chart in accordance with several aspects of the system and method.

As shown in FIG. 18, another aspect of the invention relates to (a) converting a base version of software into an alternate representation, (b) applying a patch to the alternate representation of the base version to create an alternate representation of an updated version, and (c) converting the alternate representation of an updated version of software into the updated version.

As shown in FIGS. 1 and 2, data 170 in client device 120, 150 may store different versions of software. For example, data 170 may store a base version 172, an updated version 174, an alternate representation 176 of the base version 172, and an alternate representation 178 of the updated version 174, that are respectively identical to the corresponding versions stored on server 110.

Memory 164 may store a patch 180, that is executable by processor 162 and is identical to the patch 280 stored on server 110. In one aspect, patch 180 is transmitted from server 110 to clients 120, 150. Patch 180 may include (1) instructions for creating an alternate representation 176 of the base version 172 (2) the differences between the alternate base version 176 and alternate updated version 178 (3) instructions for applying those differences to the alternate base version 176 so as to create an alternate updated version 178, and (4) and instructions for creating the updated version 174 from the alternate updated version 178.

Thus, processor 162 in the client device may execute patch 180 to create the updated version 174 of the software from base version 172 of the software.

While certain advantages are derived from the aspects described above, it will be readily appreciated that numerous modifications are possible.

It will be understood that the system and method is not limited to any specific type of program. For example, it may be used to create alternate versions of, and patches for, web-browsers such as Google Chrome or operating systems like Microsoft Vista or Linux. Because a patch in accordance with the system and method will be substantially smaller than conventional patches in many circumstances, it may be particularly advantageous when sent to devices—such as cell phones and wireless PDAs—that are limited in their ability to promptly receive or adequately store larger patches.

It should also be understood that while the base and updated versions are described as software, the system and method may be applied to other types of information comprised of references and non-references such as documents and data structures.

The modification of the alternate representation of the updated version to reduce the differences between it and the alternate representation of the base version may be implemented in various ways. In one aspect, the respective lists of the alternate representation of the updated and base versions may be compared using a simple algorithm that goes through and checks every permutation and combination of assigning indexes to addresses in order to determine the combination that may result in a desired reduction of differences between the two versions. For increased efficiency, more sophisticated algorithms may be used, such as those employed for simulated annealing, genetic programming, depth-first search, and sub-graph isomorphism.

While absolute addresses have been used to describe various aspects, it is to be understood that the references are not limited to absolute addresses, and may be relative addresses as typically used with re-locatable code. In addition, the inventive aspects described herein are not limited to machine code format of a base and updated version of software, and may be readily applied to any format such as source code or assembly language format.

Furthermore, the references may include direct references, indirect references, or employ other relative addressing modes for referring to particular addresses. For example, the references may include displacement values, which may reference a location in the software based on a distance between a base address and the address of the location being referenced. In addition, the references may reference a location in the software that itself contains another reference to a location in the software.

Further still, the references may be determined from any portion of the software. For example, portions of the software may include data that are understood as references to other portions of the software.

Additionally, while the references have been exemplarily described as a series of bytes, this is not a requirement. Thus, a reference may be any number of contiguous or non-contiguous bits of the software that are together understood to be a reference to a location in the software. For example, for machine architectures such as those for the ARM or HPPA processors, certain operations contain one or more fields of bits that may together be understood as referencing another portion of the software.

Although patch generator 300 and patch transmitter 310 have been described as above, it will be readily understood that the numerous modifications are possible in various aspects. For example, patch generator 300 may also include functionality of the patch transmitter 310. Alternatively, the functionality of patch generator 300 may be implemented using separate components, where the components together operate to create the alternate representations 276, 278, and the patch 280 as described above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of generating a patch comprising:
converting a first version of a program into a first alternate representation, the first alternate representation distinguishing between first references and first non-references, where the first references are portions of the first version that refer to other portions of the first version and where the first non-references are portions of the first version that do not refer to other portions of the first version;
converting a second version of the program into a second alternate representation where portions of the second version are the same as the first version and where portions of the second version are different than the first version, the second alternate representation distinguishing between second references and second non-references, where the second references are portions of the second version that refer to other portions of the second version and where the second non-references are portions of the second version that do not refer to other portions of the second version;
modifying, using a processor, a portion of the second alternate representation based on a comparison of the second references with the first references while retaining information to convert the modified second alternate representation back into the second version; and
generating a patch representing the differences between the first alternate representation and the modified second alternate representation.

2. The method of claim 1 wherein modifying a portion of the second representation further comprises modifying the second representation so as to reduce the differences between the first and second representation.

3. The method of claim 1 further comprising identifying targets, where a target is a portion of the version that is referred to by a reference.

4. The method of claim 3 wherein each representation associates each target and each reference with an index value, such that each target is assigned a unique index value, and such that each reference is assigned the index value of the reference's target.

5. The method of claim 4 wherein each representation stores the references as an ordered list of indexes, where the order reflects the relative order of the references in the version.

6. The method of claim 1 wherein each representation stores a control list of values, where each member of the control list is associated with a portion of the version, and where the value of a member identifies whether the portion is a reference or a non-reference.

7. The method of claim 1 wherein each representation stores a list of non-references, where each member of the non-reference list is associated with a non-reference portion of the version, and where the value of a member identifies the value of the non-reference portion in the version.

8. The method of claim 7 wherein a plurality of the members of the non-reference list are associated with operations.

9. The method of claim 8 wherein the operations are represented in the non-reference list based on a machine code value.

10. The method of claim 1 wherein the first and second references comprise absolute addresses.

11. The method of claim 1 wherein the first and second references comprise relative addresses.

12. The method of claim 1 wherein the first and second references comprise absolute and relative addresses.

13. The method of claim 1 wherein the patch is executable by a processor.

14. The method of claim 1, wherein modifying the second representation based on a comparison of the second references with the first references comprises using an algorithm selected from the group consisting of a simulated annealing algorithm, a depth-first search algorithm, a sub-graph isomorphism algorithm, a genetic programming algorithm, or a combination thereof.

15. The method of claim 1 further comprising transmitting the patch over a network to a computing device.

16. A system comprising:
a memory storing instructions and data, the data comprising a first version of a program and a second version of the program;
a processor to execute the instructions and to process the data; wherein the instructions comprise:
converting the first version of the program into a first alternate representation, the first alternate representation distinguishing between first references and first non-references, where the first references are portions of the first version that refer to other portions of the first version and where the first non-references are portions of the first version that do not refer to other portions of the first version;
converting the second version of the program into a second alternate representation where portions of the second version are the same as the first version and where portions of the second version are different than the first version, the second alternate representation distinguishing between second references and second non-references, where the second references are portions of the second version that refer to other portions of the second version and where the second non-references are portions of the second version that do not refer to other portions of the second version;

modifying a portion of the second alternate representation based on a comparison of the second references with the first references while retaining information to convert the modified second alternate representation back into the second version; and storing, in the memory, a patch representing the differences between the first alternate representation and the modified second alternate representation.

17. The system of claim 16 wherein modifying a portion of the second representation further comprises modifying the second representation so as to reduce the differences between the first and second representation.

18. The system of claim 16, wherein the instructions further comprise identifying targets, where a target is a portion of the version that is referred to by a reference.

19. The system of claim 18, wherein each representation associates each target and each reference with an index value, such that each target is assigned a unique index value, and such that each reference is assigned the index value of the reference's target.

20. The system of claim 19 wherein each representation stores the references as an ordered list of indexes, where the order reflects the relative order of the references in the version.

21. The system of claim 16 wherein each representation stores a control list of values, where each member of the control list is associated with a portion of the version, and where the value of a member identifies whether the portion is a reference or a non-reference.

22. The system of claim 16 wherein each representation stores a list of non-references, where each member of the non-reference list is associated with a non-reference portion of the version, and where the value of a member identifies the value of the non-reference portion in the version.

23. The system of claim 22 wherein a plurality of the members of the non-reference list are associated with operations.

24. The system of claim 23 wherein the operations are represented in the non-reference list based on a machine code value.

25. The system of claim 16 wherein the first and second references comprise absolute addresses.

26. The system of claim 16 wherein the first and second references comprise relative addresses.

27. The method of claim 16 wherein the first and second references comprise absolute and relative addresses.

28. The system of claim 16 further comprising a network and a computing device, wherein the instructions further comprise transmitting the patch over the network to the computing device.

29. A system comprising:

a first computer at a first node of a network, the first computer comprising a first memory storing a first set of instructions and a first processor that processes data in accordance with the first set of instructions;

the first computer having access to a first version of a program;

a second computer at a second node of a network, the second computer comprising a second memory storing a second set of instructions and a second processor that processes data in accordance with the second set of instructions;

the second computer having access to the first version of the program and having access to a second version of the program;

wherein the second set of instructions comprise:

converting the first version of the program into a first alternate representation, the first alternate representation distinguishing between first references and first non-references, where the first references are portions of the first version that refer to other portions of the first version and where the first non-references are portions of the first version that do not refer to other portions of the first version;

converting the second version of the program into a second alternate representation where portions of the second version are the same as the first version and where portions of the second version are different than the first version, the second alternate representation distinguishing between second references and second non-references, where the second references are portions of the second version that refer to other portions of the second version and where the second non-references are portions of the second version that do not refer to other portions of the second version;

modifying a portion of the second alternate representation based on a comparison of the second references with the first references while retaining information to convert the modified second alternate representation back into the second version;

generating a patch representing the differences between the first alternate representation and the modified second alternate representation, and transmitting the patch to the first computer;

and wherein the first set of instructions comprise:

converting the first version of the program into the first alternate representation;

receiving the patch representing the differences between the first alternate representation and the modified second alternate representation;

creating, based on the patch, the modified second alternate representation from the first alternate representation; and converting the modified second alternate representation into the second version of the program.

30. The system of claim 29 wherein modifying a portion of the second representation further comprises modifying the second representation so as to reduce the differences between the first and second representation.

31. The system of claim 29, wherein the first set of instructions further comprise identifying targets, where a target is a portion of the version that is referred to by a reference.

32. The system of claim 31, wherein each representation associates each target and each reference with an index value, such that each target is assigned a unique index value, and such that each reference is assigned the index value of the reference's target.

33. The system of claim 32 wherein each representation stores the references as an ordered list of indexes, where the order reflects the relative order of the references in the version.

34. The system of claim 29 wherein each representation stores a control list of values, where each member of the control list is associated with a portion of the version, and where the value of a member identifies whether the portion is a reference or a non-reference.

35. The system of claim 29 wherein each representation stores a list of non-references, where each member of the non-reference list is associated with a non-reference portion of the version, and where the value of a member identifies the value of the non-reference portion in the version.

36. The system of claim 35 wherein a plurality of the members of the non-reference list are associated with operations.

37. The system of claim 36 wherein the operations are represented in the non-reference list based on a machine code value.

* * * * *